US012669979B2

(12) United States Patent
Sahu et al.

(10) Patent No.: US 12,669,979 B2
(45) Date of Patent: Jun. 30, 2026

(54) DATA RECORD MASTERING

(71) Applicant: Schlumberger Technology Corporation, Sugar Land, TX (US)

(72) Inventors: Khileshwar Sahu, Pune (IN); Radhika Bali, Pune (IN); Avdhesh Kumar Jha, Pune (IN); Ashish Deole, Pune (IN); Mahesh Kumar Daksha, Pune (IN); Sachin Gupta, Pune (IN); Daya Golwala, Pune (IN); Todd Dixon, Pune (IN); Edgard Ernesto Jose Zambrano, Pune (IN); Akanksha Ajay Gangawane, Pune (IN); Shantanu Kirkire, Pune (IN); Pradeep Agrawal, Pune (IN); Roma Ranjan, Houston, TX (US); Jayshree Bose, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/938,729

(22) Filed: Nov. 6, 2024

(65) Prior Publication Data

US 2025/0165218 A1 May 22, 2025

(30) Foreign Application Priority Data

Nov. 17, 2023 (IN) .............................. 202311078235
Aug. 16, 2024 (IN) .............................. 202411062202

(51) Int. Cl.
*G06F 7/00* (2006.01)
*G06F 7/14* (2006.01)
(Continued)

(52) U.S. Cl.
CPC ............ *G06F 7/14* (2013.01); *G06F 16/2386* (2019.01); *G06F 16/24564* (2019.01)

(58) Field of Classification Search
CPC .. G06F 7/14; G06F 16/2386; G06F 16/24564; G06F 16/215
See application file for complete search history.

(56) References Cited

U.S. PATENT DOCUMENTS 4,216,536 A * 8/1980 More ...................... E21B 47/22
367/40
4,398,272 A * 8/1983 Sibert ...................... G01V 1/44
367/33
(Continued)

OTHER PUBLICATIONS

Extended Search Report issued in European Patent Appliction No. 24211174.8 dated Mar. 24, 2025, 6 pages.
(Continued)

*Primary Examiner* — Mohammed R Uddin
(74) *Attorney, Agent, or Firm* — Kyle R. Miiller

(57) ABSTRACT

According to various embodiments, techniques for providing a subsurface master record for a subsurface data record are presented. The techniques include: determining at least one subsurface data record for mastering; obtaining a respective subsurface master record that matches the at least one subsurface data record; and merging the at least one subsurface data record with the respective subsurface master record. The techniques may also include updating each subsurface data record of the at least one subsurface data record with an indication of a relationship between the each subsurface data record and the respective subsurface master record.

20 Claims, 17 Drawing Sheets

(51) Int. Cl.
    *G06F 16/23*     (2019.01)
    *G06F 16/2455*     (2019.01)

(56) References Cited

U.S. PATENT DOCUMENTS

| | | | | |
|---|---|---|---|---|
| 4,758,956 | A * | 7/1988 | Duffy | G01V 1/288 |
| | | | | 702/10 |
| 7,403,942 | B1 * | 7/2008 | Bayliss | G06F 16/215 |
| | | | | 707/999.005 |
| 10,489,388 | B1 * | 11/2019 | Rogynskyy | H04L 51/046 |
| 10,607,043 | B2 * | 3/2020 | Camargo | G06F 30/20 |
| 11,100,519 | B1 * | 8/2021 | Donohue | G06F 16/2365 |
| 11,157,954 | B1 * | 10/2021 | Belanger | G06Q 30/0201 |
| 11,373,257 | B1 * | 6/2022 | Guo | G06N 20/00 |
| 12,253,986 | B1 * | 3/2025 | Adams | G06F 16/285 |
| 2004/0220955 | A1 * | 11/2004 | McKee | G06Q 30/02 |
| 2006/0294151 | A1 * | 12/2006 | Wong | G06Q 30/02 |
| 2007/0073488 | A1 * | 3/2007 | Moore | G01V 1/362 |
| | | | | 702/14 |
| 2007/0276858 | A1 * | 11/2007 | Cushman, II | G06F 16/215 |
| | | | | 707/999.102 |
| 2009/0024589 | A1 * | 1/2009 | Sood | G06F 16/972 |
| | | | | 707/E17.135 |
| 2009/0144338 | A1 * | 6/2009 | Feng | G06F 16/273 |
| 2009/0225630 | A1 * | 9/2009 | Zheng | G01V 1/42 |
| | | | | 367/81 |
| 2010/0161230 | A1 * | 6/2010 | Chu | G01V 1/32 |
| | | | | 702/14 |
| 2012/0072464 | A1 * | 3/2012 | Cohen | G06F 16/215 |
| | | | | 707/E17.044 |
| 2012/0215628 | A1 * | 8/2012 | Williams | G06F 30/20 |
| | | | | 707/E17.069 |
| 2014/0244300 | A1 * | 8/2014 | Bess | G06F 16/22 |
| | | | | 705/3 |
| 2014/0324882 | A1 * | 10/2014 | Giovanni | G06F 16/2246 |
| | | | | 707/742 |
| 2015/0169774 | A1 * | 6/2015 | Budzienski | G06Q 50/01 |
| | | | | 707/734 |
| 2016/0210427 | A1 * | 7/2016 | Mynhier | G16H 10/60 |
| 2016/0275133 | A1 * | 9/2016 | Moore | E21B 47/00 |
| 2019/0129981 | A1 * | 5/2019 | Haas | G06F 16/27 |
| 2019/0145253 | A1 * | 5/2019 | Spence | E21B 49/06 |
| | | | | 175/50 |
| 2022/0358336 | A1 * | 11/2022 | Abolhasssani | G06N 5/01 |
| 2024/0036225 | A1 * | 2/2024 | AlMustafa | G01V 1/345 |
| 2024/0184946 | A1 * | 6/2024 | Ayub | E21B 47/02 |
| 2024/0201407 | A1 * | 6/2024 | Rudrigues | G01V 1/345 |
| 2025/0237779 | A1 * | 7/2025 | AlFahmi | G01V 1/46 |

OTHER PUBLICATIONS

Anonymous, "QuickStart Guide 3—Matching" retrieved from the Internet on Dec. 3, 2019 at [https://www.clearmdm.com/wp-content/uploads/2017/05/clearMDS-QuickStart-Guide-3-Matching-v1.3.pdf], 32 pages.
Anonymous, "Record linkage—Wikidepia, the free encyclopedia", retrieved from the internet on Dec. 7, 2016 at [https://web.archive.org/web/20150509130215/http://en.wikipedia.org/wiki/Record_linkage], 9 pages.

* cited by examiner

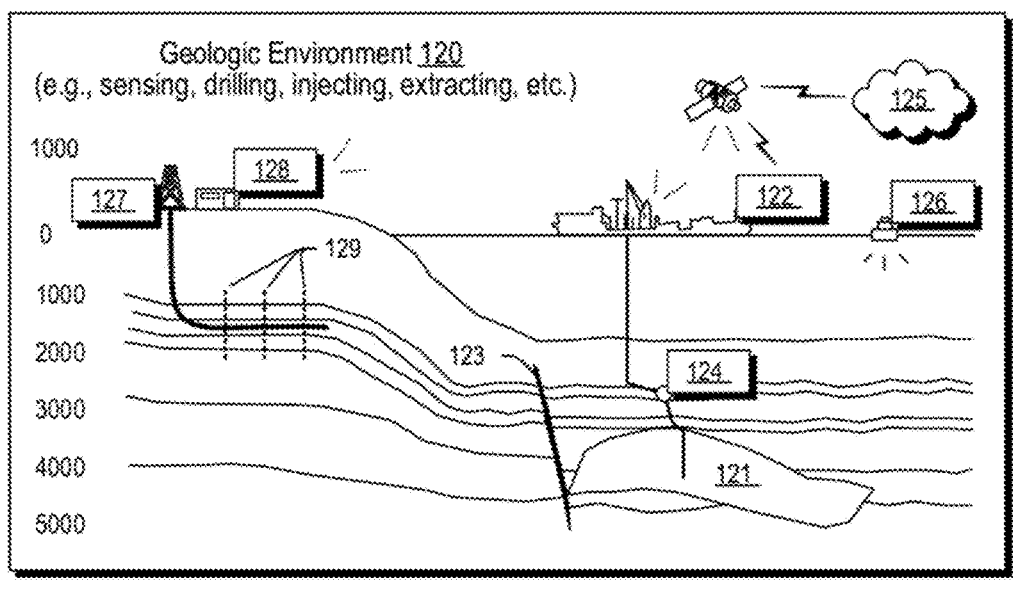
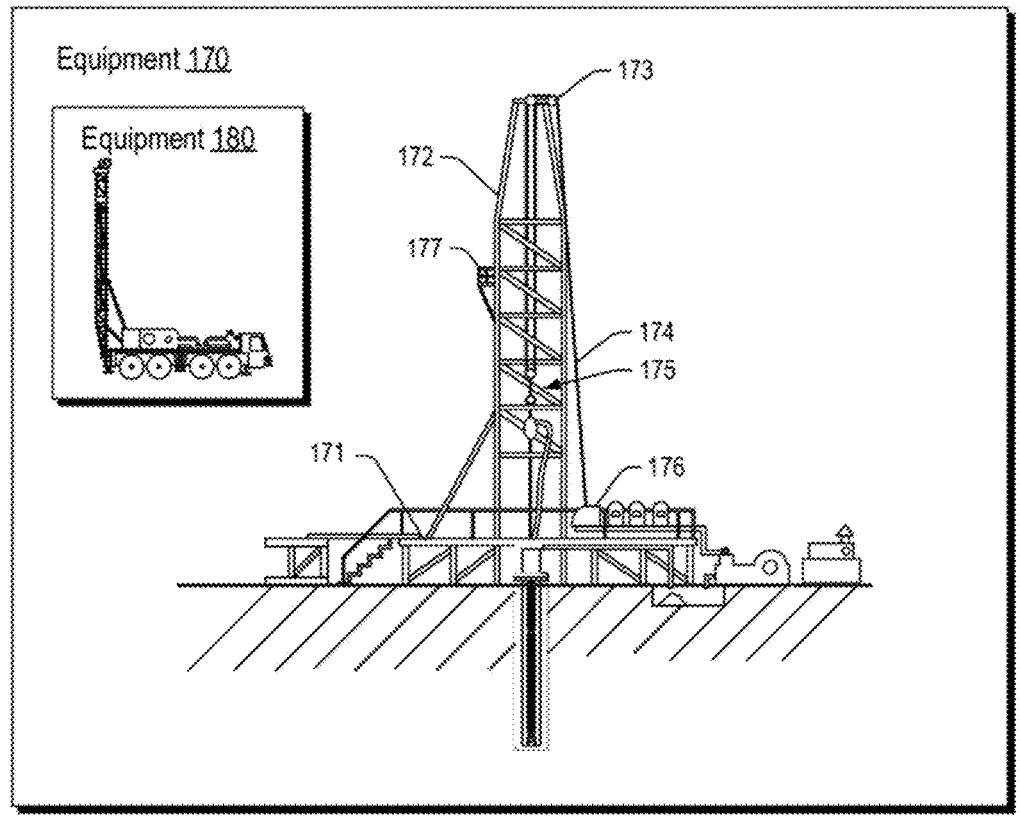
*FIG. 1*

*Ex. Deploying mastering services after data loading started, changes in mastering rules, etc*

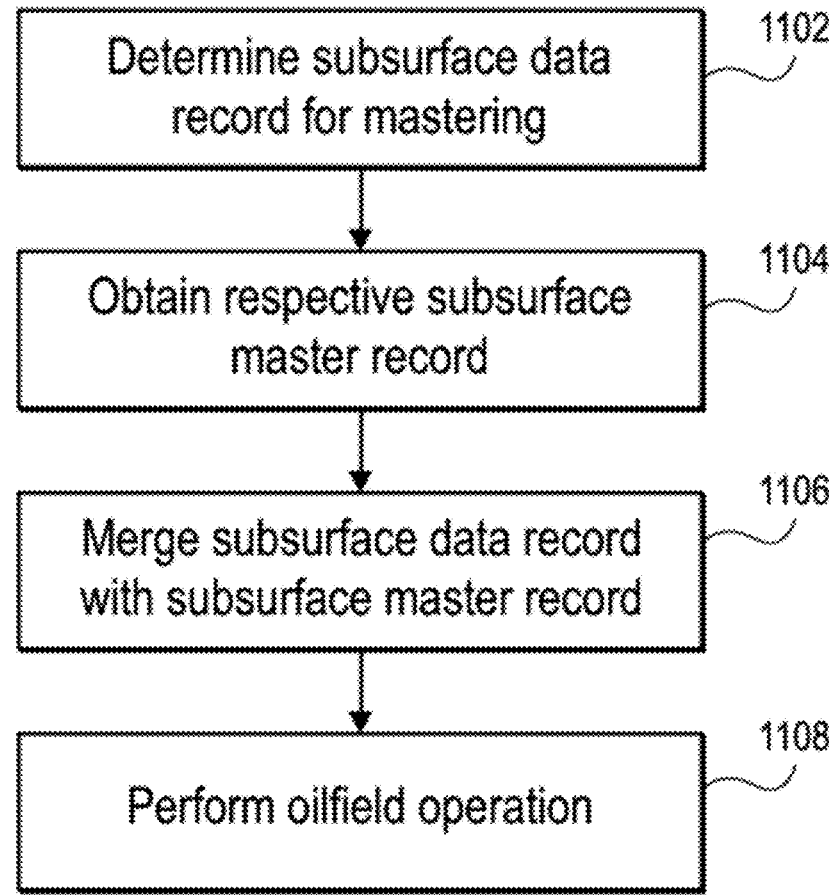
Determine subsurface data record for mastering  — 1102
Obtain respective subsurface master record  — 1104
Merge subsurface data record with subsurface master record  — 1106
Perform oilfield operation  — 1108
1100
*FIG. 11*

START

DETERMINING AT LEAST ONE DATA RECORD FOR
MASTERING
1302

OBTAINING A RESPECTIVE MASTER RECORD
1305

MERGING THE AT LEAST ONE DATA RECORD WITH
THE RESPECTIVE MASTER RECORD
1308

UPDATING EACH DATA RECORD OF THE AT LEAST
ONE DATA RECORD WITH AN INDICATION OF A
RELATIONSHIP BETWEEN THE EACH DATA
RECORD AND THE RESPECTIVE MASTER RECORD
1310

END

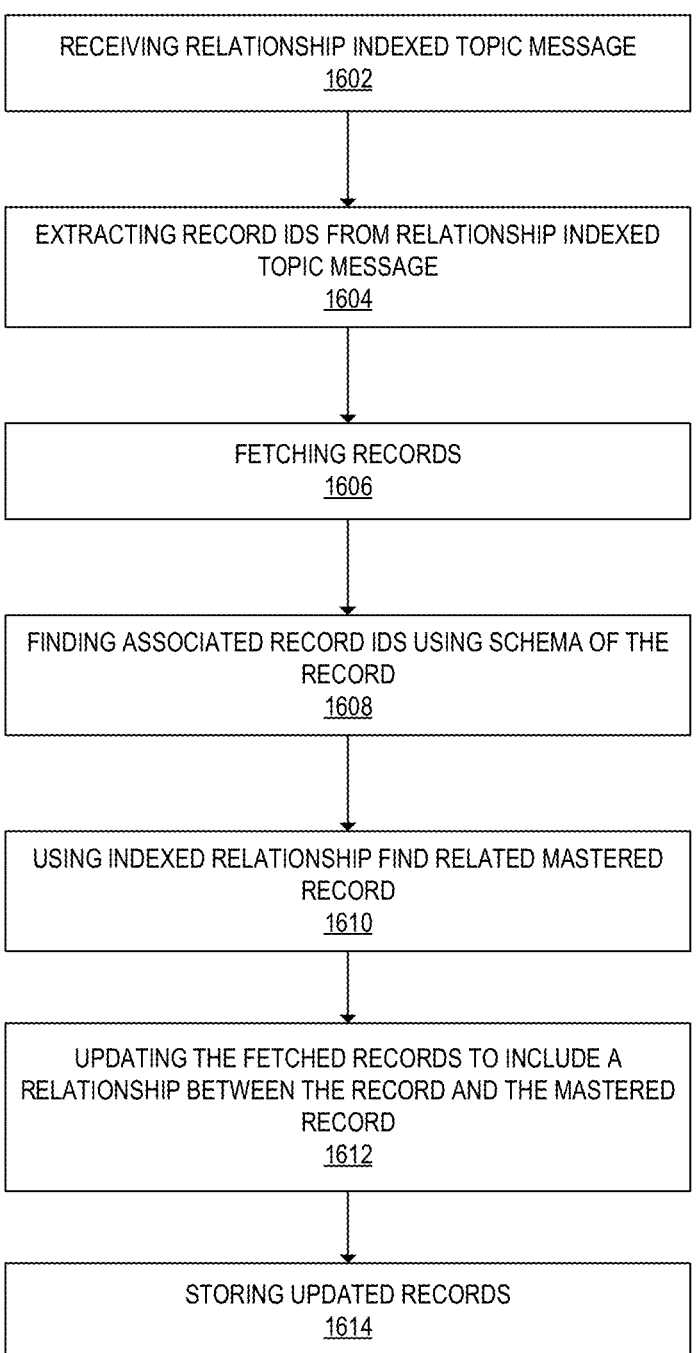

RECEIVING RELATIONSHIP INDEXED TOPIC MESSAGE
1602

EXTRACTING RECORD IDS FROM RELATIONSHIP INDEXED
TOPIC MESSAGE
1604

FETCHING RECORDS
1606

FINDING ASSOCIATED RECORD IDS USING SCHEMA OF THE
RECORD
1608

USING INDEXED RELATIONSHIP FIND RELATED MASTERED
RECORD
1610

UPDATING THE FETCHED RECORDS TO INCLUDE A
RELATIONSHIP BETWEEN THE RECORD AND THE MASTERED
RECORD
1612

STORING UPDATED RECORDS
1614

_FIG. 16_

DATA RECORD MASTERING

CROSS-REFERENCE TO RELATED APPLICATIONS

This application claims benefit to India Provisional Application Number 202311078235 filed on Nov. 17, 2023 and India Provisional Application Number 202411062202 filed on Aug. 16, 2024, which are both incorporated herein by reference in their entirety.

BACKGROUND

National oil companies receive data from many different service/vendor companies. These companies may perform activities in the same data entities, e.g., wells, wellbores, etc. Ingesting this data into a subsurface data platform, such as the Open Subsurface Data Universe (OSDU) subsurface data platform, will result in multiple records for same data entity, coming from different sources. This causes users to have access to more than one record for the same data entity, without certainty of which one is the best source of data. Even worse, most of the time the best record for a determined data entity will include a combination of attributes from multiple sources.

SUMMARY

According to various embodiments, a method of providing a subsurface master record for a subsurface data record is presented. The method includes determining at least one subsurface data record for mastering, obtaining a respective subsurface master record that matches the at least one subsurface data record, and merging the at least one subsurface data record with the respective subsurface master record.

Various optional features of the above embodiments include the following. The determining the at least one subsurface data record for mastering may include detecting that the at least one subsurface data record is new. The determining the at least one subsurface data record for mastering may include detecting that the at least one subsurface data record has changed. The determining the at least one subsurface data record for mastering may include: preparing a bulk endpoint, and providing, at the bulk endpoint, search results corresponding to at least one user provided search parameter. The preparing and the providing may be preceded by a user driven change that implicates mastering. The obtaining may include executing match rules for the at least one subsurface data record, determining, based on the executing, that the respective subsurface master record does not exist, and generating the respective subsurface master record. The obtaining may include executing match rules for the at least one subsurface data record, and obtaining the respective subsurface master record in response to the executing. The determining at least one subsurface data record for mastering may include determining subsurface data records for mastering, and the merging may include applying, to the subsurface data records for mastering, priority rules that rank data sources. The method may include obtaining a liberated subsurface data record for mastering, obtaining a subsurface master data record that matches the liberated subsurface data record, and linking the liberated subsurface data record with the subsurface master data record. The method may include obtaining a liberated subsurface data record for mastering, determining that a subsurface master data record that matches the liberated subsurface data record does not exist, generating a subsurface master data record, and linking the liberated subsurface data record with the subsurface master data record.

According to various embodiments, a system for providing a subsurface master record for a subsurface data record is presented. The system includes an electronic processor and a non-transitory computer-readable medium including instructions, that, when executed by the electronic processor, configure the electronic processor to perform actions. The actions include determining at least one subsurface data record for mastering, obtaining a respective subsurface master record that matches the at least one subsurface data record, and merging the at least one subsurface data record with the respective subsurface master record.

Various optional features of the above embodiments include the following. The determining the at least one subsurface data record for mastering may include detecting that the at least one subsurface data record is new. The determining the at least one subsurface data record for mastering may include detecting that the at least one subsurface data record has changed. The determining the at least one subsurface data record for mastering may include preparing a bulk endpoint and providing, at the bulk endpoint, search results corresponding to at least one user provided search parameter. The preparing and the providing may be preceded by a user driven change that implicates mastering. The obtaining may include executing match rules for the at least one subsurface data record, determining, based on the executing, that the respective subsurface master record does not exist, and generating the respective subsurface master record. The obtaining may include executing match rules for the at least one subsurface data record, and obtaining the respective subsurface master record in response to the executing. The determining at least one subsurface data record for mastering may include determining subsurface data records for mastering, and the merging may include applying, to the subsurface data records for mastering, priority rules that rank data sources. The actions may further include obtaining a liberated subsurface data record for mastering, obtaining a subsurface master data record that matches the liberated subsurface data record, and linking the liberated subsurface data record with the subsurface master data record.

According to various embodiments, a method of providing an Open Subsurface Data Universe (OSDU) Well-Known Entity (WKE) for an OSDU Well-Known Schema (WKS) is presented. The method includes determining at least one WKS for mastering, where the determining includes at least one of detecting that the at least one WKS has changed, or detecting that the at least one WKS is new, obtaining a respective WKE that matches the at least one WKS, and merging the at least one subsurface data record with the respective subsurface master record, where the merging includes applying priority rules that rank data sources.

Combinations, (including multiple dependent combinations) of the above-described elements and those within the specification have been contemplated by the inventors and may be made, except where otherwise indicated or where contradictory.

One or more embodiments provide for a computer readable storage medium. The computer readable storage medium stores computer readable program code which, when executed by at least one processor, cause the at least one processor to perform operations. The operations include determining at least one subsurface data record to be mastered. The operations also include obtaining a respective subsurface master record that matches the at least one subsurface data record. The operations also include merging the at least one subsurface data record with the respective subsurface master record. The operations also include updating each subsurface data record of the at least one subsurface data record with an indication of a relationship between each subsurface data record and the respective subsurface master record.

Other aspects of one or more embodiments will be apparent from the following description and the appended claims.

BRIEF DESCRIPTION OF DRAWINGS

FIG. 1 shows an example of a geologic environment according to various embodiments;

FIG. 11 is a flow diagram for a method of providing a subsurface master record for a subsurface data record according to various embodiments.

FIG. 14, FIG. 15, and FIG. 16 show an example of subsurface data record mastering, in accordance with one or more embodiments.

Like elements in the various figures are denoted by like reference numerals for consistency.

DETAILED DESCRIPTION

Figure 2:
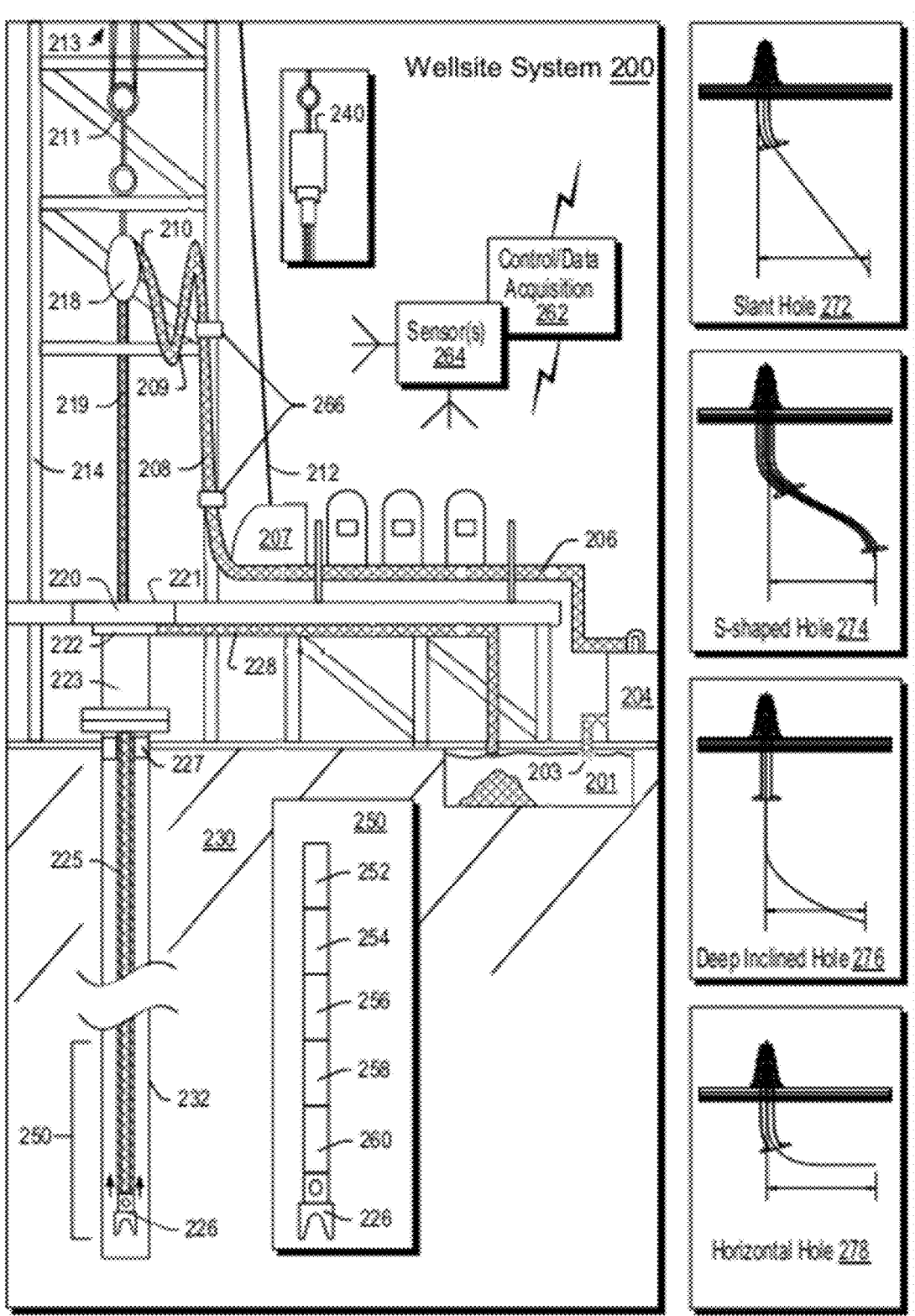
FIG. 2 shows an example of a wellsite system (e.g., at a wellsite that may be onshore or offshore) according to various embodiments.

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

According to various embodiments, a system for and method of subsurface data record mastering is presented. Embodiments may be used to provide master subsurface data records for the Open Subsurface Data Universe (OSDU) subsurface data platform, by way of non-limiting example. The method can include providing a unique master record for a given data entity. Embodiments may be used to generate new, or amend existing, master subsurface data records based on data from a variety of sources. Embodiments may provide master subsurface data records that include data at a variety of hierarchies, not limited to a top hierarchy. For example, in the context of OSDU, embodiments may provide master subsurface data records that include data at any level of a JSON hierarchy. Embodiments may initiate subsurface data mastering automatically or on demand, e.g., based on a set of rules. Further, embodiments may be used to initiate subsurface data mastering on demand.

These and other features and advantages are shown and described presently in reference to the figures.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 may be mobile as carried by a vehicle; noting that the equipment 170 may be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block assembly 175 may provide an indication as to how much pipe has been deployed.

A derrick may be a structure used to support a crown block and a traveling block operatively coupled to the crown block at least in part via line. A derrick may be pyramidal in shape and offer a suitable strength-to-weight ratio. A derrick may be movable as a unit or in a piece-by-piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line may cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block may include a set of pulleys (e.g., sheaves) that may be located at or near a top of a derrick or a mast, over which line is threaded. A traveling block may include a set of sheaves that may be moved up and down in a derrick or a mast via line threaded in the set of sheaves of the traveling block and in the set of sheaves of a crown block. A crown block, a traveling block and a line may form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick may include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe located at or near the center of a derrick or a mast and to throw a line around the pipe and pull it back into its storage location (e.g., fingerboards), for example, until a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that may be pulled out of the hole and/or place or replaced in the hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 may include a mud tank 201 for holding mud and other material (e.g., where mud may be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 may provide for operation of the drillstring 225 and other operations. As shown, the wellsite system 200 includes the platform and the derrick 214 positioned over the borehole 232. As mentioned, the wellsite system 200 may include the rotary table 220 where the drillstring 225 pass through an opening in the rotary table 220.

As shown in the example of FIG. 2, the wellsite system 200 may include the kelly 218 and associated components, etc., or a top drive 240 and associated components. As to a kelly example, the kelly 218 may be a square or hexagonal metal/alloy bar with a hole drilled therein that serves as a mud flow path. The kelly 218 may be used to transmit rotary motion from the rotary table 220 via the kelly drive bushing 219 to the drillstring 225, while allowing the drillstring 225 to be lowered or raised during rotation. The kelly 218 may pass through the kelly drive bushing 219, which may be driven by the rotary table 220. As an example, the rotary table 220 may include a master bushing that operatively couples to the kelly drive bushing 219 such that rotation of the rotary table 220 may turn the kelly drive bushing 219 and hence the kelly 218. The kelly drive bushing 219 may include an inside profile matching an outside profile (e.g., square, hexagonal, etc.) of the kelly 218; however, with slightly larger dimensions so that the kelly 218 may freely move up and down inside the kelly drive bushing 219.

As to a top drive example, the top drive 240 may provide functions performed by a kelly and a rotary table. The top drive 240 may turn the drillstring 225. As an example, the top drive 240 may include one or more motors (e.g., electric and/or hydraulic) connected with appropriate gearing to a short section of pipe called a quill, that in turn may be screwed into a saver sub or the drillstring 225 itself. The top drive 240 may be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 may hold mud, which may be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together (e.g., in stand increments) to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud may then flow via a passage (e.g., or passages) in the drillstring 225 and out of ports located on the drill bit 226 (see, e.g., a directional arrow). As the mud exits the drillstring 225 via ports in the drill bit 226, the mud may thereby circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud may be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may be modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud may cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft. The alternator may include at least one stator winding electrically coupled to a control circuit to selectively short the at least one stator winding to electromagnetically brake the alternator and thereby selectively cease or interrupt rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging while drilling (LWD) module 254, a measuring while drilling (MWD) module 256, an optional module 258, a roto-steerable system and motor 260, and the drill bit 226.

The LWD module 254 may be housed in a suitable type of drill collar and may contain one or a plurality of selected types of logging tools. It will also be understood that more than one LWD module 254 and/or MWD module 256 may be employed, for example, as represented at by the module 256 of the drillstring assembly 250. Where the position of an LWD module 254 is mentioned, as an example, it may refer to a module at the position of the LWD module 254, the MWD module 256, etc. An LWD module may include capabilities for measuring, processing, and storing information, as well as for communicating with the surface equipment. In the illustrated example, the LWD module 254 may include a seismic measuring device.

The MWD module 256 may be housed in a suitable type of drill collar and may contain one or more devices for measuring characteristics of the drillstring 225 and the drill bit 226. As an example, the MWD module 256 may include equipment for generating electrical power, for example, to power various components of the drillstring 225. As an example, the MWD module 256 may include the telemetry equipment 252, for example, where the turbine impeller may generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation may include directional drilling where, for example, at least a portion of a well includes a curved axis. For example, consider a radius that defines a curvature, where an inclination angle with respect to vertical may vary. Such inclination angle may vary until reaching an angle between about 30 degrees and about 60 degrees or, for example, an angle to about 90 degrees or possibly greater than about 90 degrees.

As an example, a directional well may include several shapes where each of the shapes may aim to meet particular operational demands. As an example, a drilling process may be performed on the basis of information as and when it is relayed to a directional driller. As an example, inclination and/or direction may be modified based on information received during a drilling process.

As an example, deviation of a bore may be accomplished in part by use of a downhole motor and/or a turbine. As to a motor, for example, a drillstring may include a positive displacement motor (PDM).

As an example, a system may be a steerable system and include equipment to perform method such as geosteering. As an example, a steerable system may include a PDM of a turbine that may be disposed upon a lower part of a drillstring at which, just above a drill bit, a bent sub may be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment may make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, may allow for implementing a geosteering method. Such a method may include navigating a subsurface environment, for example, to follow a desired route to reach a desired target or targets.

As an example, a drillstring may include an azimuthal density neutron (AND) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering may include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 may include one or more sensors 264 that are operatively coupled to the control and/or data acquisition system 262. As an example, a sensor or sensors may be at surface locations. As an example, a sensor or sensors may be at downhole locations. As an example, a sensor or sensors may be disposed at one or more remote locations that are not within a distance of the order of about one hundred meters from the wellsite system 200. As an example, a sensor or sensors may be disposed at an offset wellsite where the wellsite system 200 and the offset wellsite are in a common field (e.g., oil and/or gas field).

As an example, one or more of the sensors 264 may be provided for tracking pipe, tracking movement of at least a portion of a drillstring, etc.

As an example, the system 200 may include one or more sensors 266 that may sense and/or transmit signals to a fluid conduit such as a drilling fluid conduit (e.g., a drilling mud conduit). For example, in the system 200, the one or more sensors 266 may be operatively coupled to portions of the standpipe 208 through which mud flows. As an example, a downhole tool may generate pulses that may travel through the mud and be sensed by one or more of the one or more sensors 266. In such an example, the downhole tool may include associated circuitry such as, for example, encoding circuitry that may encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 may include a transmitter that may generate signals that may be transmitted downhole via mud (e.g., drilling fluid) as a transmission medium.

As an example, one or more portions of a drillstring may become stuck. The term stuck may refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this may refer to a portion of a drillstring that cannot be rotated or moved axially. As an example, a condition referred to as "differential sticking" may be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking may result in time and financial cost.

As an example, a sticking force may be a product of the differential pressure between the wellbore and the reservoir and the area that the differential pressure is acting upon. Accordingly, a relatively low differential pressure (delta p) that is applied over a large working area may be just as effective in sticking pipe as a high differential pressure that is applied over a small area.

As an example, a condition referred to as "mechanical sticking" may be a condition, where limiting or prevention of motion of the drillstring by a mechanism other than differential pressure sticking occurs. Mechanical sticking may be caused, for example, by one or more of junk in the hole, wellbore geometry anomalies, cement, keyseats or a buildup of cuttings in the annulus.

Figure 3:
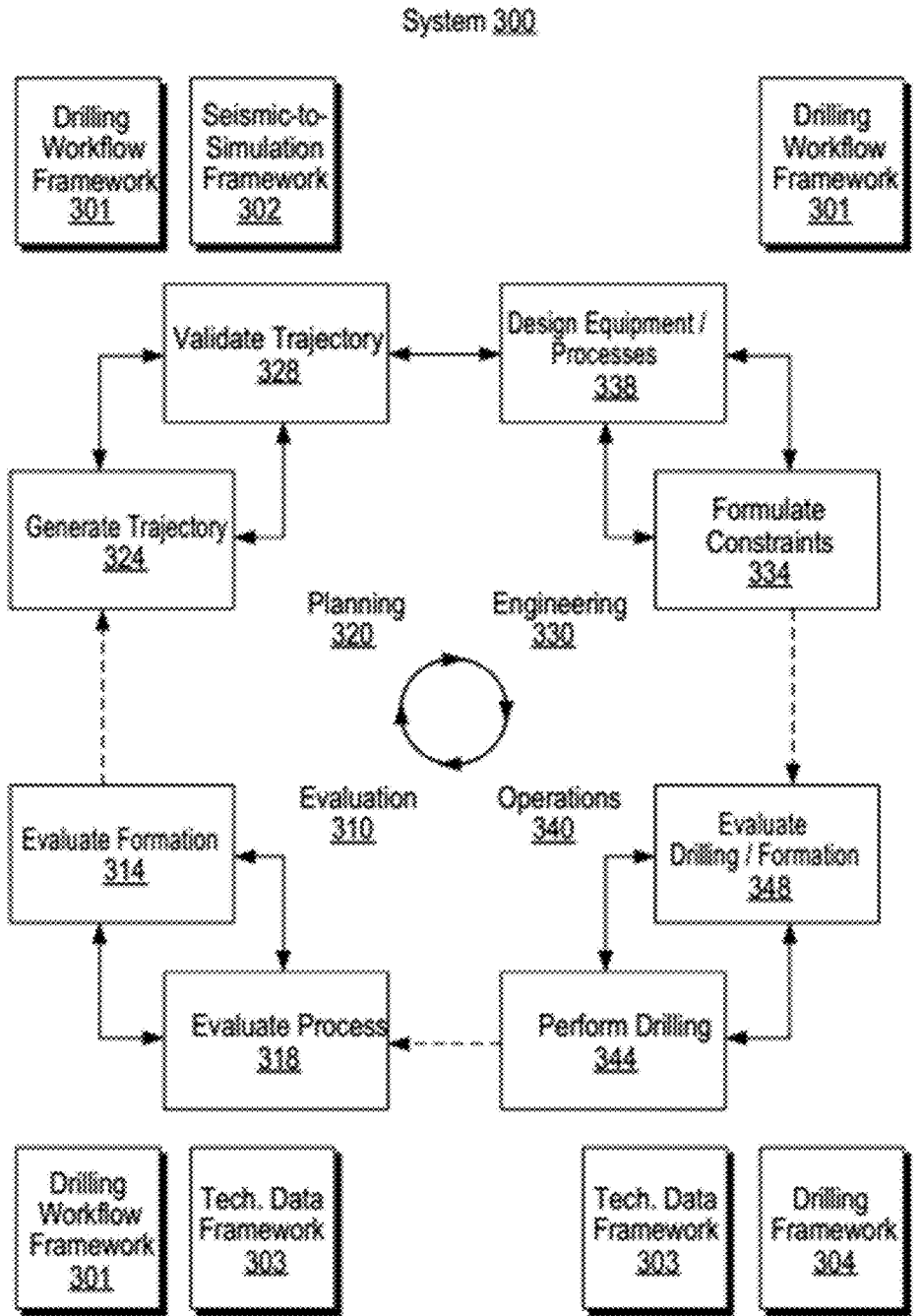
FIG. 3 shows an example of a system that includes various equipment for evaluation, planning, engineering and operations according to various embodiments.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 may be, for example, the PETREL® framework (Schlumberger Limited, Houston, Texas) and the technical data framework 303 may be, for example, the TECHLOG® framework (Schlumberger Limited, Houston, Texas).

As an example, a framework may include entities that may include earth entities, geological objects or other objects such as wells, surfaces, reservoirs, etc. Entities may include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™ .NET™ framework (Redmond, Washington), which provides a set of extensible object classes. In the .NET™ framework, an object class encapsulates a module of reusable code and associated data structures. Object classes may be used to instantiate object instances for use in by a program, script, etc. For example, borehole classes may define objects for representing boreholes based on well data.

As an example, a framework may include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Texas), the INTERSECT® reservoir simulator (Schlumberger Limited, Houston Texas), etc.

The aforementioned PETREL® framework provides components that allow for optimization of exploration and development operations. The PETREL® framework includes seismic to simulation software components that may output information for use in increasing reservoir performance, for example, by improving asset team productivity. Through use of such a framework, various professionals (e.g., geophysicists, geologists, well engineers, reservoir engineers, etc.) may develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Texas), which allows for integration of add-ons (or plug-ins) into a PETREL® framework workflow. The OCEAN® framework environment leverages .NET™ tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework may include a model simulation layer along with a framework services layer, a framework core layer and a modules layer. The framework may include the commercially available OCEAN® framework where the model simulation layer may include or operatively link to the commercially available PETREL® model-centric software package that hosts OCEAN® framework applications. In an example embodiment, the PETREL® software may be considered a data-driven application. The PETREL® software may include a framework for model building and visualization. Such a model may include one or more grids.

As an example, the model simulation layer may provide domain objects, act as a data source, provide for rendering and provide for various user interfaces. Rendering may provide a graphical environment in which applications may display their data while the user interfaces may provide a common look and feel for application user interface components.

As an example, domain objects may include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project may be accessed and restored using the model simulation layer, which may recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data may be data that is acquired via a seismic survey where sources and receivers are positioned in a geologic environment to emit and receive seismic energy where at least a portion of such energy may reflect off subsurface structures. As an example, a seismic data analysis framework or frameworks (e.g., consider the OMEGA® framework, marketed by Schlumberger Limited, Houston, Texas) may be utilized to determine depth, extent, properties, etc. of subsurface structures. As an example, seismic data analysis may include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Texas) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks may facilitate construction of models, analysis of data (e.g., PETROMOD® framework data analyzed using PETREL® framework capabilities), and coupling of workflows.

As mentioned, a drillstring may include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) may acquire borehole image data. A data acquisition sequence for such a tool may include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework may be interoperable with one or more other frameworks such as, for example, the PETREL® framework.

Figure 4:
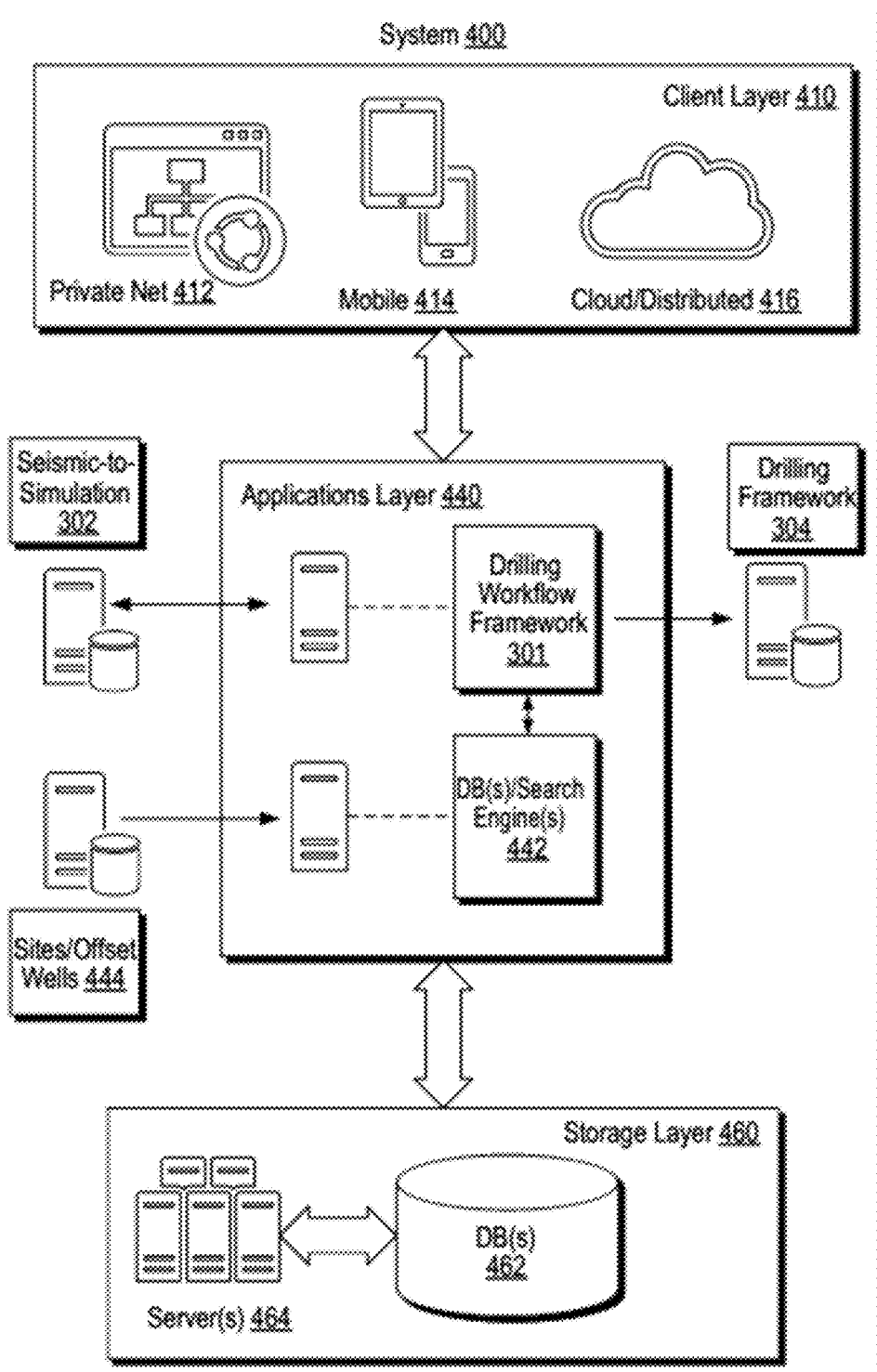
FIG. 4 shows an example of a system that includes a client layer, an applications layer and a storage layer according to various embodiments.

FIG. 4 shows an example of a system 400 that includes a client layer 410, an applications layer 440 and a storage layer 460. As shown, the client layer 410 may be in communication with the applications layer 440, and the applications layer 440 may be in communication with the storage layer 460.

The client layer 410 may include features that allow for access and interactions via one or more private networks 412, one or more mobile platforms and/or mobile networks 414 and via the "cloud" 416, which may be considered to include distributed equipment that forms a network such as a network of networks.

In the example of FIG. 4, the applications layer 440 includes the drilling workflow framework 301 as mentioned with respect to the example of FIG. 3. The applications layer 440 also includes a database management component 442 that includes one or more search engines modules.

As an example, the database management component 442 may include one or more search engine modules that provide for searching one or more information that may be stored in one or more data repositories. As an example, the STUDIO E&P™ knowledge environment (Schlumberger Ltd., Houston, Texas) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 4, the applications layer 440 may include communicating with one or more resources such as, for example, the seismic-to-simulation framework 302, the drilling framework 304 and/or one or more sites, which may include one or more offset wellsites 444. As an example, the applications layer 440 may be implemented for a particular wellsite where information may be processed as part of a workflow for operations such as, for example, operations performed, being performed and/or to be performed at the particular wellsite. As an example, an operation may involve directional drilling, for example, via geosteering.

In the example of FIG. 4, the storage layer 460 may include various types of data, information, etc., which may be stored in one or more databases 462. As an example, one or more servers 464 may provide for management, access, etc., to data, information, etc., stored in the one or more databases 462. As an example, the database management component 442 may provide for searching as to data, information, etc., stored in the one or more databases 462.

As an example, the database management component 442 may include features for indexing, etc. As an example, information may be indexed at least in part with respect to a wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 400 of FIG. 4 may be implemented to perform one or more portions of one or more workflows associated with the system 300 of FIG. 3. For example, the drilling workflow framework 301 may interact with the technical data framework 303 and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

Figure 5:
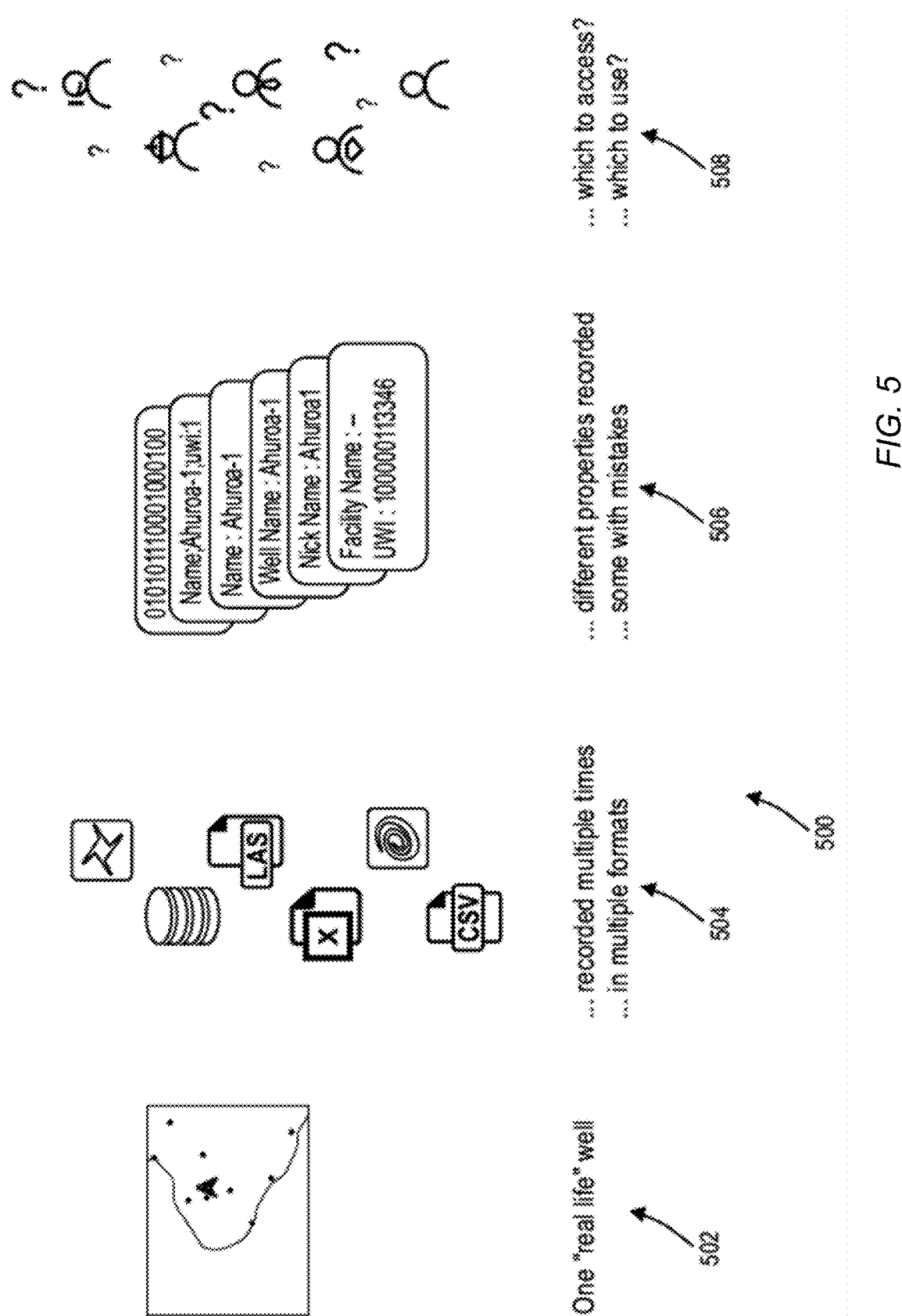
FIG. 5 is a schematic diagram illustrating a lack of subsurface data mastering according to the prior art.

FIG. 5 is a schematic diagram 500 illustrating a lack of subsurface data mastering according to the prior art. As shown in FIG. 5, at 502, a single real-life well, for example, can be associated with data recorded multiple times in a variety of formats, as at 504. Such data can include, by way of non-limiting example, any of the data shown and described herein in reference to FIGS. 1-4. The recorded data can be assimilated into multiple subsurface data records in a subsurface data platform, such as by way of non-limiting example, OSDU, as at 506. However, this can result in the presence of multiple records that represent the same real-life well. This multiplicity of data, often with inconsistencies among the various subsurface data records, can lead to confusion among users of the subsurface data platform, as at 508. For example, such a user may be unclear as to which subsurface data record to access or use, for a given real-life well.

Figure 6:
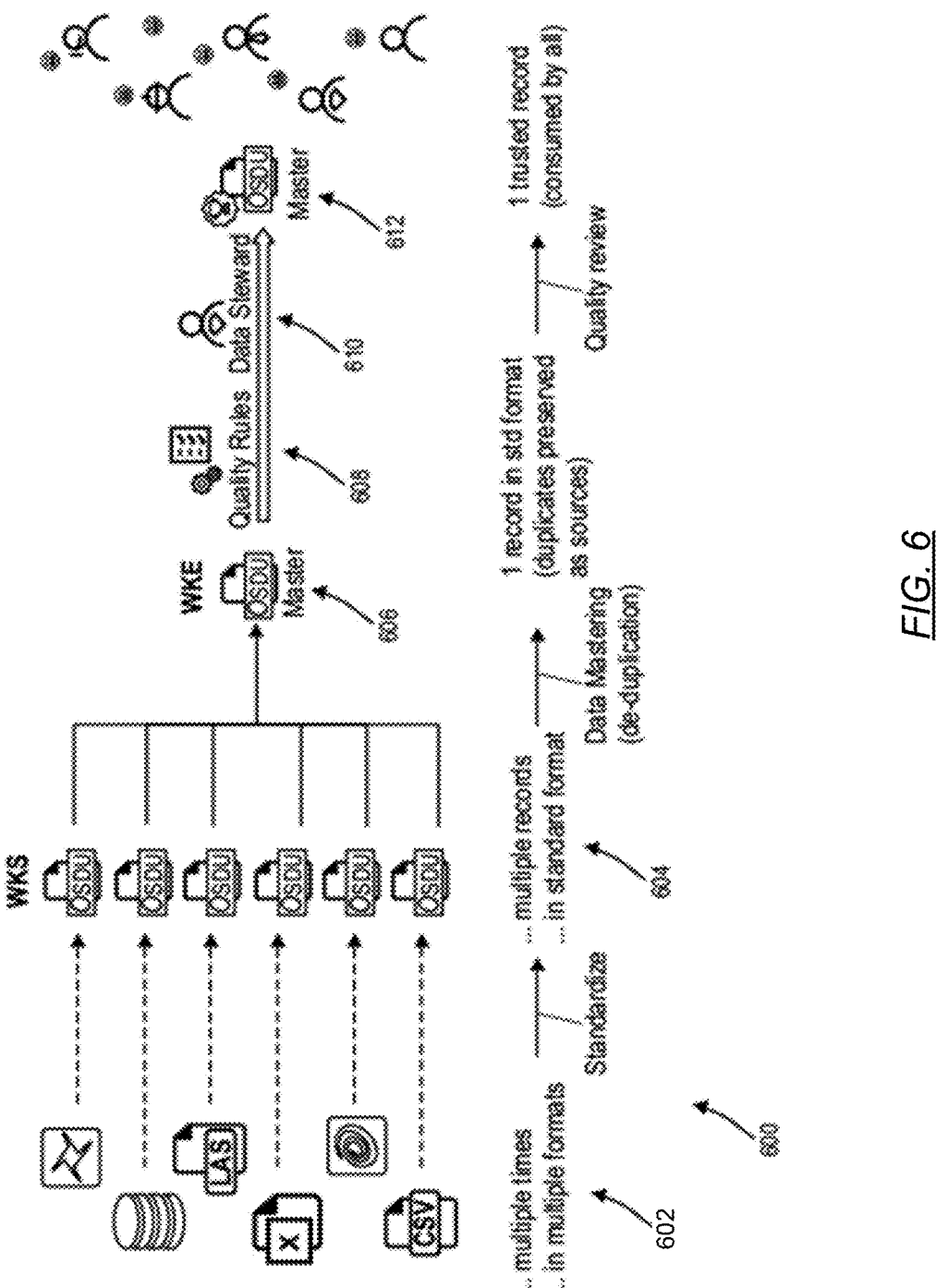
FIG. 6 is a schematic diagram illustrating subsurface data mastering according to various embodiments.

FIG. 6 is a schematic diagram 600 illustrating subsurface data mastering according to various embodiments. A data mastering aim is to provide users with a unique subsurface master data record that they can trust to be used in energy workflows. According to some embodiments, such a subsurface master data record may be built around an OSDU schema structure and fit with current existing data types. However, according to some embodiments, and following specific procedures, data mastering can be applied to custom data types. This can be further integrated with OSDU equivalent data types as they become available.

As shown in FIG. 6, at 602, multiple records in a variety of formats may exist to describe a single real-life well, for example. Such records may be assimilated into a subsurface data platform. By way of non-limiting example, various embodiments are illustrated herein in reference to FIG. 6, as well as in reference to FIGS. 7-11, with respect to the OSDU data platform; however, embodiments are not so limited. In the context of OSDU, the assimilated records may be in the form of Well-Known schema (WKS), as at 604. Although the WKS may standardize the data format, they yet represent multiple subsurface data records for the same well, for example, in the subsurface data platform. At 606, data mastering merges data from the multiple WKS into a single subsurface data record, in the context of OSDU, a Well-Known Entity (WKE).

The mastering process thus de-duplicates the records for the well. In general, the de-duplication data mastering process allows data managers to configure match and merge rules, which can use key attributes and source prioritization, to generate a unique master subsurface data record for each data-master entity. Source prioritization may ensure that an appropriate source/attribute combination is used to generate the master subsurface record, such that its content refers to the most trusted source for each attribute. For example, a WKS that is obtained from an original well measurement maybe prioritized over a WKS for the same data that is derived from different information at a later date. Details of such prioritization are shown and described herein in reference to FIG. 8. In general, the WKS from which a WKE is derived may be preserved in the subsurface data platform, e.g., in order to identify original sources.

Once the WKE is generated, it may be subjected to quality rules, as at 608. Such quality rules may ensure that the WKE is sufficiently reliable, e.g., by discarding unreliable data. The quality rules may be implemented automatically, and directed by a data steward, as at 610. After having undergone quality review according to the quality rules, a single WKE may be used by any person or process.

Figure 7:
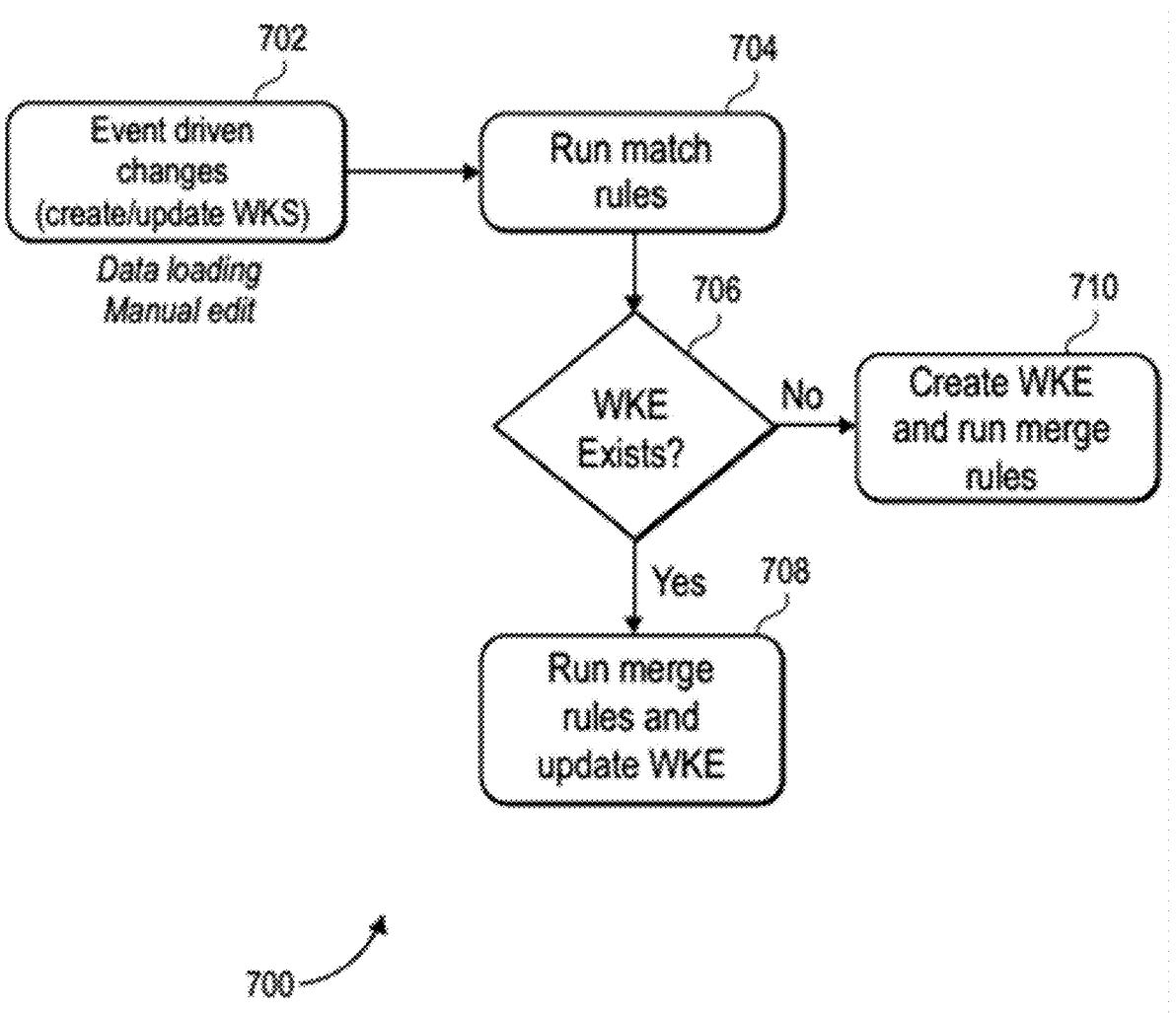
FIG. 7 is a flow diagram for a method of automated rule-based subsurface data mastering according to various embodiments.
Figure 9:
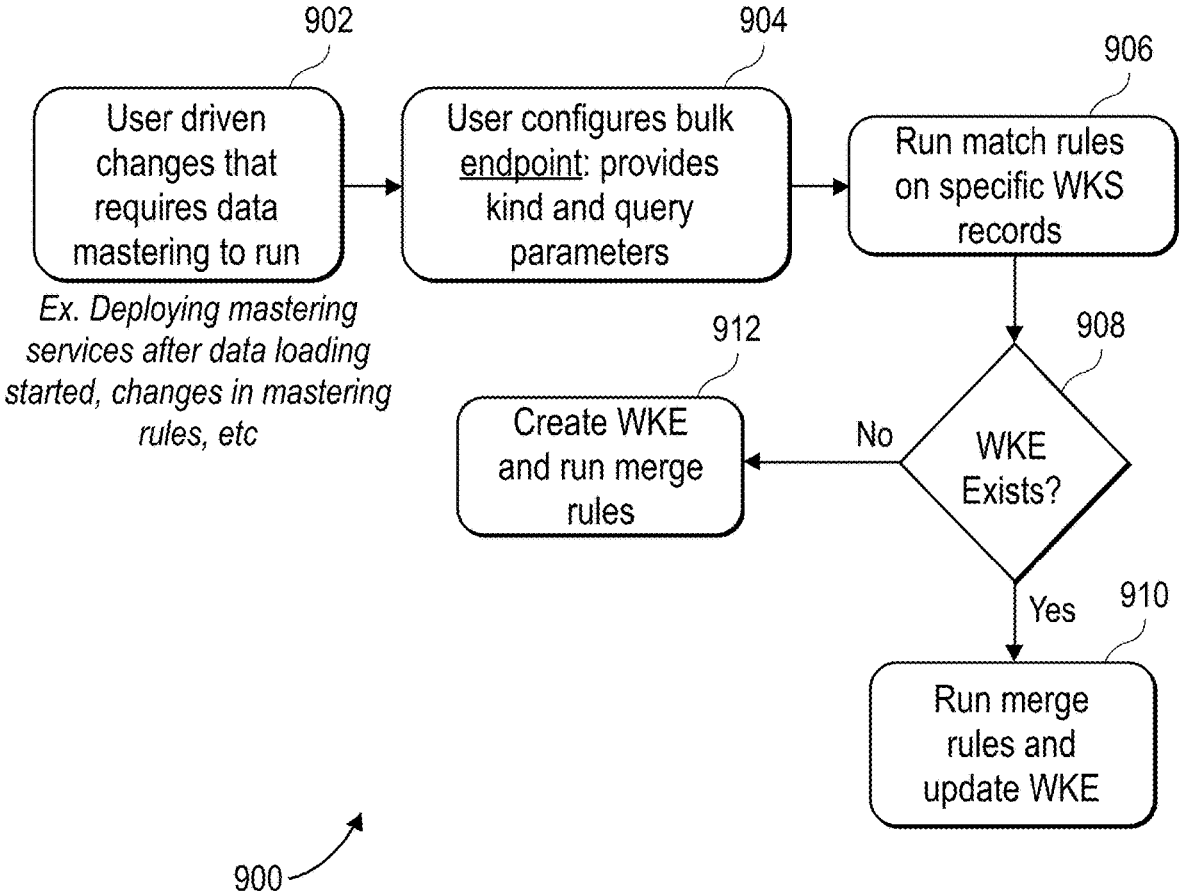
FIG. 9 is a flow diagram for a method of on-demand rule-based subsurface data mastering according to various embodiments.
Figure 10:
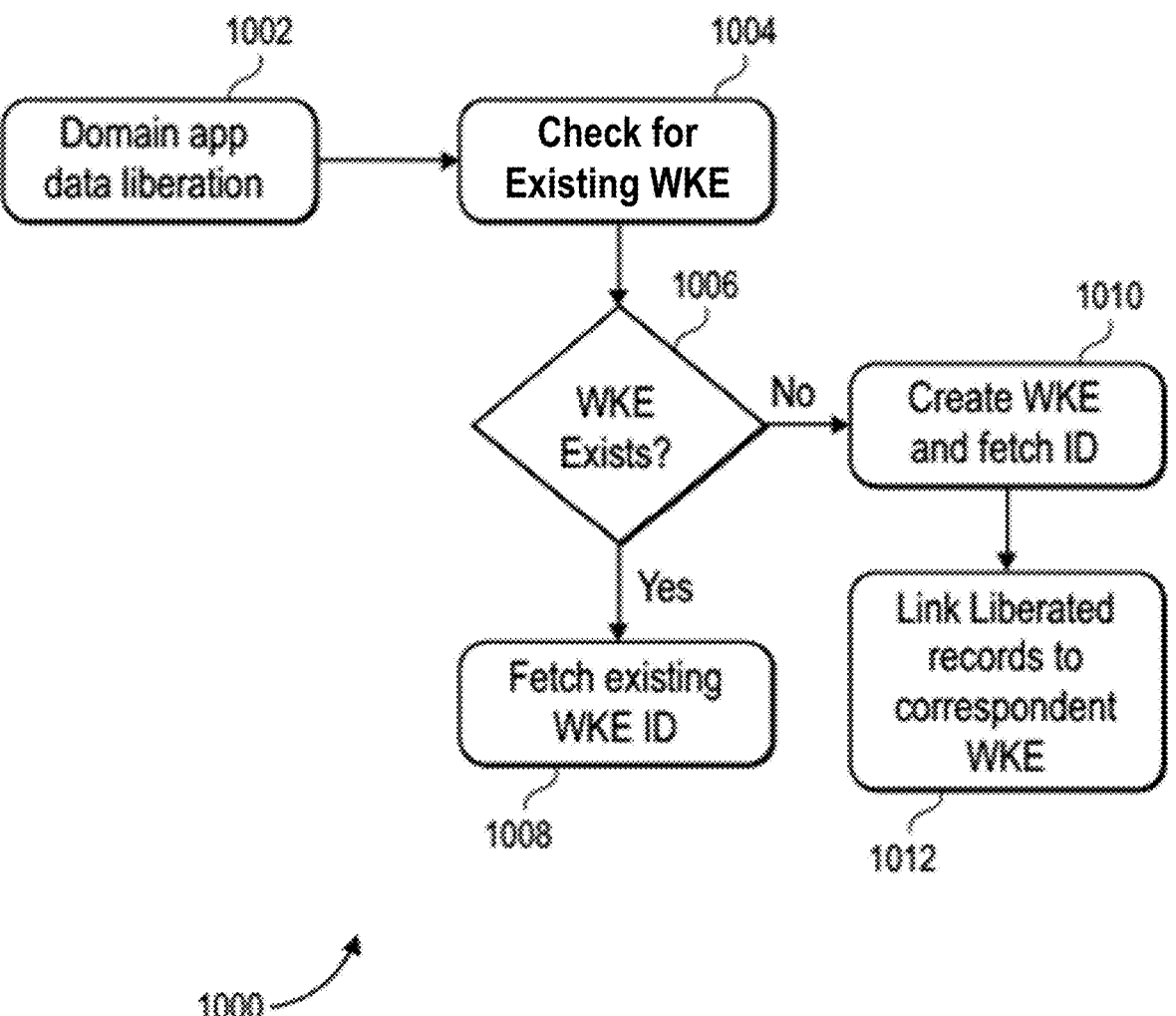
FIG. 10 is a flow diagram for a method of on-demand data mastering according to various embodiments.

Thus, subsurface data mastering according to various embodiments ensures that the data is stored in a common schema structure for seamless data access and consumption from different applications. For example, such a common schema may be a WKS. Some embodiments further resolve the problem of multiple siloed systems giving information about the same entity through the use of de-duplication, by using match and merge rules to generate a unique master record, e.g., a WKE. A user can then use this single WKE record as the source of trust in all their workflows. FIGS. 7, 9, and 10 below illustrate various subsurface data mastering approaches, according to various embodiments.

FIG. 7 is a flow diagram for a method 700 of automated rule-based subsurface data mastering according to various embodiments. The method 700 may be automated by events that are generated on the system when data that matches the rules enters the system. For example, the method 700 may generally be choreographed ahead of time.

At 702, the method 700 includes detecting an event that implicates a need to subsurface data record mastering. By way of non-limiting example, such an event may include one or more WKS being created, e.g., due to data loading into the system. As another non-limiting example, such an event may include one or more WKS being updated or otherwise changed, e.g., from a manual edit. Other events are contemplated and within the scope of various embodiments. After 702, control passes to 704.

At 704, the method 700 includes running match rules with respect to the WKS for which the event was detected at 702. The match rules may include a query that specifies a Unique Well Identifier (UWI), for example. Other match rules may include a query that specifies one or more properties included in the WKS. After 704, control passes to 706.

At 706, a decision is made as to whether a WKE corresponding to the WKS for which the event was detected at 702 exists. The decision may be dependent on whether the match rules of 704 resulted in the identification of a matching WKE. If so, control passes to 708. Otherwise, control passes to 710.

At 708, if a WKE corresponding to the WKS exists, then the method 700 merges the data from the WKS into the data of the WKE. Merge rules, such as rules that prioritize data sources, may be used. Examples of such merge rules are shown and described herein in reference to FIG. 8.

At 710, if a WKE corresponding to the WKS does not yet exist, then the method 700 generates a WKE and executes merge rules to merge the WKE with the generated WKE. The WKE may be generated based on certain data from the WKS, such as a UWI. The generated WKE may include a data structure, into which data from the WKS is merged. Merging the WKS with the WKE may utilize merge rules, examples of which are shown and described herein in reference to FIG. 8.

Note that the data merge may include merging data at any level in the subsurface data record hierarchy. For example, in the case of OSDU, where the WKS and WKE may be implemented as hierarchal JSON objects, the data merge may include inserting data into the WKE at any hierarchal level, not limited to the top level.

Figure 8:
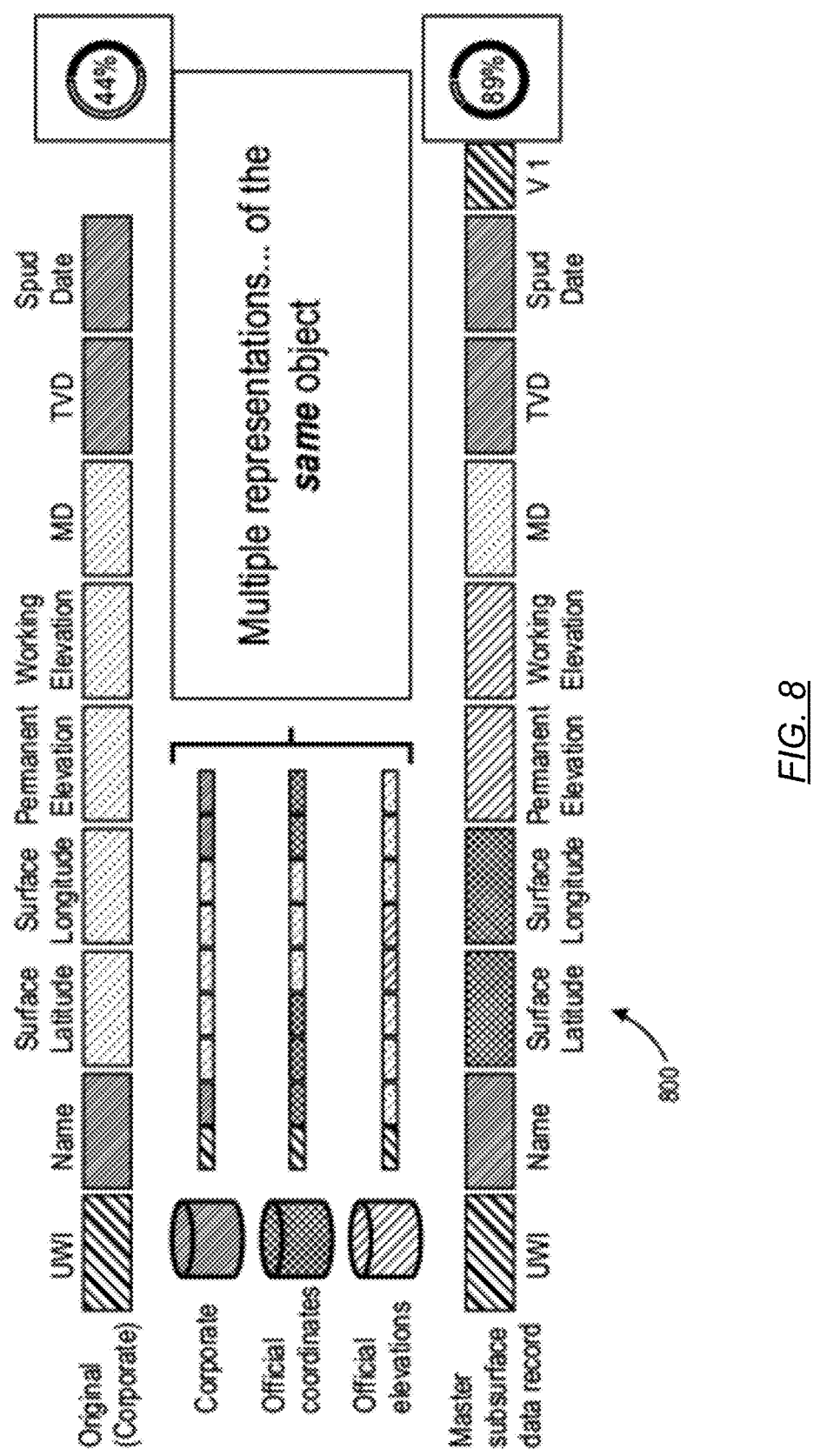
FIG. 8 is a schematic diagram representing merging subsurface data records according to various embodiments.

FIG. 8 is a schematic diagram 800 representing merging subsurface data records according to various embodiments. The merging shown and described in reference to FIG. 8 may be used according to various embodiments, including embodiments shown and described herein in reference to FIGS. 7, 9, 10, and 11, for example. As shown in FIG. 8, an original subsurface data record, such as a WKS, may be relatively incomplete, e.g., in terms of the number of available fields that are populated with data. The original subsurface data record is shown as being 44% complete. For example, its fields for UWI, name, TVD, and spud date are populated, but its fields for surface latitude, surface longitude, permanent elevation, working elevation, and MD are not. The original subsurface data record may have been populated with data from a corporate source, for example. The original source may have lacked fields for surface latitude, surface longitude, permanent elevation, working elevation, and MD. A WKS may have fields for all such data, such that a WKS populated using data from the corporate source may be incomplete as a WKS.

As shown in FIG. 8, official coordinates for the well represented by the original subsurface data record may be available in a first additional subsurface data record, e.g., a spatial database record or a WKS populated by data from a spatial database record. Such a first additional subsurface data record may lack data for other fields that are present in the original subsurface data record, or more generally, fields that are present in a WKS.

As further shown in FIG. 8, official elevations for the well represented by the original subsurface data record may be available in a second additional subsurface data record, e.g., a drilling database record or a WKS populated by data from a drilling database record. Such a second additional subsurface data record may lack data for other fields that are present in the original subsurface data record, or more generally, fields that are present in a WKS.

As further shown in FIG. 8, a master subsurface data record may be generated from the original subsurface data record, the first additional subsurface data record, and the second subsurface data record. The master subsurface data record may be a WKE, for example. The master subsurface data record may include all of the fields from the original subsurface data record, with the possible addition of a version field that contains data indicating a version number.

The master subsurface data record may be populated using merge rules, e.g., merge rules that prioritize sources. For example, a third additional subsurface data record may have data that is populated in one or more fields for which data is populated in the original subsurface data record, the first additional subsurface data record, and/or the second additional subsurface data record. However, the data from the third additional subsurface data record may conflict with, e.g., be significantly different from, the data that is present in one or more of the original subsurface data records, the first additional subsurface data record, and/or the second additional subsurface data record. To merge the original subsurface data record, the first additional subsurface data record, the second additional subsurface data record, and the third additional subsurface data record, merge rules that handle such conflicts may be implemented. Such merge rules may rank data sources according to priority, such that data from a higher ranked source is used instead of data from a lower ranked source. By way of non-limiting example, a ranking may be: original data (e.g., from measurement equipment), processed data (e.g., after compression), etc.

As another non-limiting example of a priority ranking for the purpose of merge rules, three different sources of data for the same well may exist: Corporate, Public and Government. Priorities for the ranking may be configured based on which source is most trustable for each attribute. For example, for the Field, Well Name, and Total Depth attributes, the respective rankings may be as follows:

Field: Public, Government, Corporate
Well Name: Government, Corporate, Public
Total Depth: Corporate, Government, Public As shown above, Public may be considered the highest priority source to take a Field attribute value, then Government if Public is empty, and so on. This logic may be applied for the Well Name and Total Depth attributes, based on source priorities as provided on the merge rules configuration.

FIG. 9 is a flow diagram for a method 900 of on-demand rule-based subsurface data mastering according to various embodiments. The method 900 may be performed on demand, e.g., as initiated by a user. For example, the method 900 may generally be orchestrated by a user.

At 902, the method 900 may be initiated after a user-driven change that implicates a need to subsurface data record mastering. By way of non-limiting example, such a change may include deploying subsurface data record mastering services after data loading has started. As another non-limiting example, such a change may include a user making a change to mastering rules. Other changes are contemplated and within the scope of various embodiments. After 902, control passes to 904.

At 904, the method 900 includes configuring, e.g., by a user, a bulk endpoint and providing kind and/or query parameters. The bulk endpoint may include, for example, an Application Program Interface (API). The kind and/or query parameter may specify which subsurface data records are to be subjected to the orchestrated subsurface data record mastering. By way of non-limiting example, the kind parameters may specify a particular kind of subsurface data record. As another non-limiting example, the query parameters may be defined so as to identify subsurface data records that are to be mastered through a query process.

At 906, the method 900 includes running match rules with respect to each WKS that was identified according to the kind and/or query parameters provided at 904. The match rules may include a query that specifies a Unique Well Identifier (UWI), for example. Other match rules may include a query that specifies one or more properties included in each WKS. After 906, control passes to 908.

At 908, a decision is made as to whether a WKE corresponding to each WKS that was identified at 904 exists. The decision may be dependent on whether the match rules of 906 resulted in the identification of a matching WKE. If so, control passes to 910. Otherwise, control passes to 912.

At 910, if a respective WKE corresponding to a respective WKS exists, then the method 900 merges the data from the WKS into the data of the respective WKE. This process may be repeated for each WKS provided at 904. Merge rules, such as rules that prioritize data sources, may be used. Examples of such merge rules are shown and described herein in reference to FIG. 8.

At 912, if a respective WKE corresponding to a respective WKS does not yet exist, then the method 900 generates a respective WKE and executes merge rules to merge the respective WKE with the generated WKE. This process may be repeated for each WKS provided at 904. Each WKE may be generated based on certain data from the WKS, such as a UWI. Each generated WKE may include a data structure, into which data from a respective WKS is merged. Merging a WKS with a corresponding WKE may utilize merge rules, examples of which are shown and described herein in reference to FIG. 8.

Note that each data merge may include merging data at any level in the subsurface data record hierarchy. For example, in the case of OSDU, where the WKS and WKE may be implemented as hierarchal JSON objects, a given data merge may include inserting data into the WKE at any hierarchal level, not limited to the top level.

FIG. 10 is a flow diagram for a method 1000 of on-demand data mastering according to various embodiments. The method 1000 may allow a domain team to match its data to existing (or create new) master data, to allow for data deduplication, without disrupting either of method 700 or method 900. The method 1000 may include an orchestrated and/or choreographed approach.

At 1002, the method 1000 includes domain application data liberation. In general, data liberation may include transferring data from technical applications, such as TECHLOG® and PETREL®, to a subsurface data platform, such as OSDU. For example, a user may select a data project in a specific application and then can select which data they wish to transfer. For example, for the case of well logs, a user can select multiple ones in TECHLOG®, corresponding to different wellbores, and then trigger a data liberation process. Per the data liberation job, those well logs will be created in corresponding schemas in OSDU, in compliance with OSDU schema requirements. After 1002, control passes to 1004.

At 1004, the method 1000 includes checking for an existing WKE for each WKS from 1002. The checking may include executing match rules. The match rules may include a query that specifies a Unique Well Identifier (UWI), for example. Other match rules may include a query that specifies one or more properties included in a given WKS. After 1004, control passes to 1006.

At 1006, a decision is made as to whether a WKE corresponding to each WKS from 1002 exists. The decision may be dependent on whether the match rules of 1004 resulted in the identification of a matching WKE. If so, control passes to 1008. Otherwise, control passes to 1010.

At 1008, if a WKE corresponding to the WKS exists, then the method 1000 fetches a corresponding WKE identifier from the WKE. The WKE identifier may be a UWI, by way of non-limiting example. After 1008, control passes to 1012.

At 1010, if a WKE corresponding to the WKS does not yet exist, then the method 1000 generates a WKE and fetches a corresponding WKE identifier from the generated WKE. The WKE identifier may be a UWI, by way of non-limiting example. After 1010, control passes to 1012.

At 1012, the method 1000 includes linking each liberated subsurface data record with a corresponding WKE. The linking may be by way of associating their respective WKE identifiers.

For example, during a data liberation process, it is expected that records created in OSDU platform are parented to master records (WKE), as these uniquely represent a given entity. For example, during a well log data liberation process, multiple WKS records might exists for the same wellbore, including the one created by TECHLOG®. Instead of establishing parent relationship to the TECHLOG® wellbore, the system may check if a master wellbore (e.g., a WKE) exists (e.g., at 1006), create it and fetch ID if does not (e.g., at 1010) or fetch ID if already exists and the use that ID to establish relationship from liberated welllogs to correspondent wellbore (WKE). In general, the parenting process may correspond to an entity hierarchy. For example, a wellhead data record may be considered as a parent of a wellbore data record, which may be considered as a parent of a definitive trajectory data record. By way of non-limiting example, hierarchies may include OSDU outgoing relationships for wellbore and/or OSDU wellbore referenced by other entities.

FIG. 11 is a flow diagram for a method 1100 of providing a subsurface master record for a subsurface data record according to various embodiments. The method 1100 may be implemented using hardware as shown and described herein, e.g., in reference to any of FIGS. 1-4.

At 1102, the method 1100 includes determining at least one subsurface data record for mastering. According to some embodiments, this action may include detecting that the subsurface data record is new or detecting that the subsurface data record has changed, e.g., as shown and described herein in reference to the method 700 of FIG. 7. According to some embodiments, this action may include preparing a bulk endpoint and providing, at the bulk endpoint, search results corresponding to at least one user provided search parameter, e.g., as shown and described herein in reference to the method 900 of FIG. 9.

At 1104, the method 1000 includes obtaining a respective subsurface master record that matches the at least one subsurface data record. According to some embodiments, this action may include executing match rules for the subsurface data record, determining, based on the match rules, that the respective subsurface master record does not exist, and generating the respective subsurface master record, e.g., as shown and described herein in reference to the method 700 of FIG. 7 and the method 900 of FIG. 9. According to some embodiments, this action may include executing match rules for the subsurface data record and obtaining a respective subsurface master record in response to the executing the match rules, e.g., as shown and described herein in reference to the method 700 of FIG. 7 and the method 900 of FIG. 9.

At 1106, the method 1100 includes merging the at least one subsurface data record with the respective subsurface master record. According to some embodiments, this action may include utilizing priority rules, e.g., as shown and described herein in reference to FIG. 8.

At 1108, the method 1100 includes performing an oilfield action based on the mastered subsurface data record. Any oilfield operation may be performed, not limited to drilling a wellbore. In general, any operations as shown and described herein in reference to any of FIGS. 1-4 may be performed. The oilfield action may be or include generating and/or transmitting a signal (e.g., using a computing system) that causes a physical action to occur at a wellsite. The oilfield action may also or instead include performing the physical action at the wellsite. The physical action may be or include varying a weight and/or torque on a drill bit, varying a drilling trajectory, varying a concentration and/or flow rate of a fluid pumped into a wellbore, or the like.

Data mastering further includes propagating master record relationship information. Relationships indicate links between different data sources. When records are mastered, the records can be updated to include relationship information so that source data and master data links are retained. The links may then be used when updating records. This helps retrieve and analyze mastered data in a more coherent and meaningful way.

A "relationship" refers to the associations or links between different data entities. Thus, the relationship is a stored link between the different data entities. The stored link implicitly or explicitly references the two data entities. The stored link further includes a property defining how different types of data are related to each other within the data model. For example, in the context of well data, a relationship exists between entities representing wells, wellbores, well logs, and other relevant information.

The use of relationships helps create a comprehensive and interconnected representation of data, making it easier to navigate and understand the relationships between different pieces of information. Mastered data establishes a single, authoritative source for data and maintaining data quality and integrity. Mastering data helps ensure that the records have access to accurate and consistent master data, facilitating better collaboration and decision-making.

As shown above in one non-limiting embodiment, subsurface data records, which relate to subsurface environments such as wellbores, may be used to generate master subsurface data records. Wellbore data may have three data managers which contributes Logs, Markers and Trajectories from the associated sources. Although the data is from different sources, the data relates to the same wellbore. Relationship links enable the related sources, like logs, markers, and trajectories, to be associated with the mastered records. The relationship information also enables data sharing between data managers of the various sources.

As discussed in the example above, a master wellbore record includes links to the source data records. Adding the relationship to the source data records allows the logs, markers and trajectories to be associated with the master wellbore record. Using the indexed relationship, the relationship can be propagated to the related records in order to update the record with a link to the master record.

Figure 12:
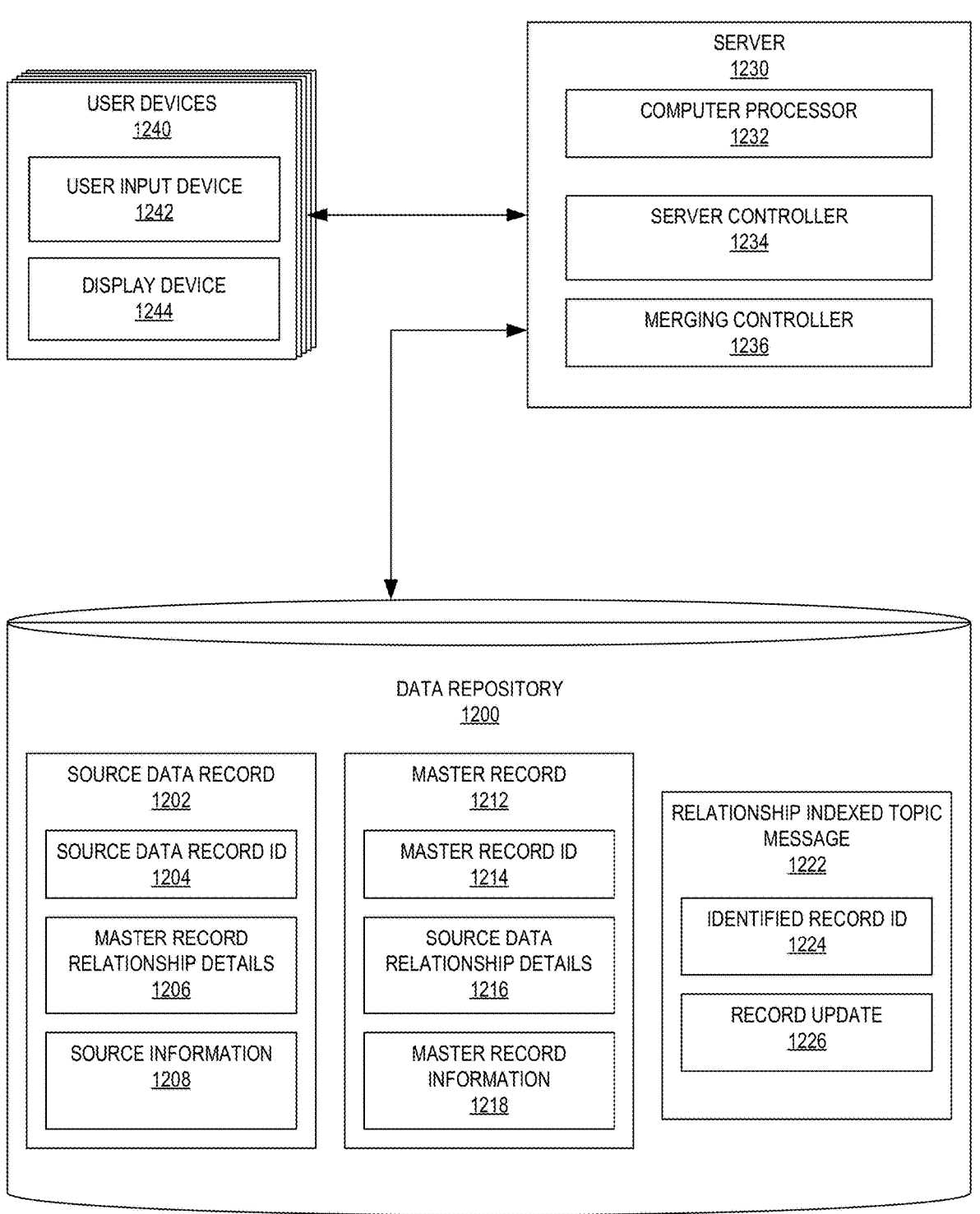
FIG. 12 shows a computing system in accordance with one or more embodiments.

Attention is now returned to the figures. FIG. 12 shows a computing system, in accordance with one or more embodiments. The system shown in FIG. 12 includes a data repository (1200). The data repository (1200) is a type of storage unit or device (e.g., a file system, database, data structure, or any other storage mechanism) for storing data. The data repository (1200) may include multiple different, potentially heterogeneous, storage units and/or devices.

The data repository (1200) stores source data record (1202). The source data record (1202) is a data object to hold source information (1208). Each source data record (1202) has a source data record ID (1204) which may be used to locate the source data record (1202).

When a source data record (1202) is used to generate a master record, such as described above, the source data record (1202) may also include master record relation details (1206). The master record relation details (1206) may store an identifier of the master record. Additionally, the master record relation details (1206) may also provide information regarding what source information (1208) from the source data record (1202) is used to create or update the master record. The master record relation details (1206) may include update information, such as the date/time of the last update of the master record from the source data record (1202).

The data repository (1200) also stores a master record (1212). The master record (1212) may be generated from multiple records, such as source data record (1202). The source data record (1202) is a data object to hold master record information (1218). The master record (1212) has a master record identifier (ID) (1214). The master record ID (1214) is a unique identifier of the master record (1212) amongst the master records. The master record ID (1214) may be used to locate the master record (1212).

The master record (1212) also includes source data relation details (1216). The source data relation details (1216) may store an identifier of each source data used to generate the master record (1212), such as source data record ID (1204). Additionally, the source data relation details (1216) may also store information regarding what information (1208) from the source data record (1202) was used to create or update the master record (1212). The source data relation details (1216) may include update information, such as the date/time of the last update of the master record information (1218) from the source data record (1202).

The data repository (1200) also stores a relationship indexed topic message (1222). The relationship indexed topic message (1222) is a message regarding data and includes at least one identified record ID (1224). The identified record ID (1224) may match a master record ID (1214) or a source data record ID (1204). The relationship indexed topic message (1222) may also include a record update (1226). The record update (1226) may provide the update for the record identified (e.g., master record (1212), source data record (1202), etc.) by the identified record ID (1224). Alternatively, the record update (1226) may provide details regarding an update to the record identified by the identified record ID (1224), for example, a timestamp of when the record was last updated.

The system shown in FIG. 12 may include other components. For example, the system shown in FIG. 12 also may include a server (1230). The server (1230) is one or more computer processors, data repositories, communication devices, and supporting hardware and software. The server (1230) may be in a distributed computing environment. The server (1230) is configured to execute one or more applications, such as a merging controller (1236). An example of a computer system and network that may form the server (1230) is described with respect to FIG. 17A and FIG. 17B.

The server (1230) includes a computer processor (1232). The computer processor (1232) is one or more hardware or virtual processors which may execute computer readable program code that defines one or more applications, such as the merging controller (1236). An example of the computer processor (1232) is described with respect to the computer processor(s) (1702) of FIG. 17A.

The server (1230) also may include a server controller (1234). The server controller (1234) is software or hardware programmed to operate the server (1230) and/or computer processor (1232). The server controller (1234) also may be software or hardware programmed to execute one or more steps of the method of FIG. 13. The server controller (1234)

also may control or coordinate the functions of the merging controller (1236), defined below.

The server (1230) also includes a merging controller (1236). The merging controller (1236) is software or application specific hardware which, merge multiple records, such as source data record (1202), into a master record, such as master record (1212).

FIG. 12 also shows one or more user devices (1240). The user devices (1240) are the computing systems which users use to access and/or update data records, such as source data record (1202) and master record (1212). The user devices (1240) may include a mouse, keyboard, microphone, touch screen, haptic device, etc., with which the user may interact. Thus, the user devices (1240) are computing systems which a user may use to interact with the server (1230). For example, the relationship indexed topic message (1222) may be received from one or more of the user devices (1240).

The user devices (1240) include a display device (1244) that may display data and messages that are transmitted and received by the server (1230). The data and messages may include text, audio, video, etc., and include data from source data record (1202) and/or master record (1212).

In many cases, the user devices (1240) are not part of a system owned or operated by the entity that owns or operates the server (1230). Such user devices (1240) may be referred to as "remote" devices, and thus may not be part of the system of FIG. 12. However, one or more of the user devices (1240) may be part of the same system of which the server (1230) is a part. In this case, such user devices (1240) may be referred to as "local" devices, even if the user devices (1240) are not in the same physical geographical location. Local devices may be considered part of the system shown in FIG. 12.

While FIG. 12 shows a configuration of components, other configurations may be used without departing from the scope of one or more embodiments. For example, various components may be combined to create a single component. As another example, the functionality performed by a single component may be performed by two or more components.

Figure 13:
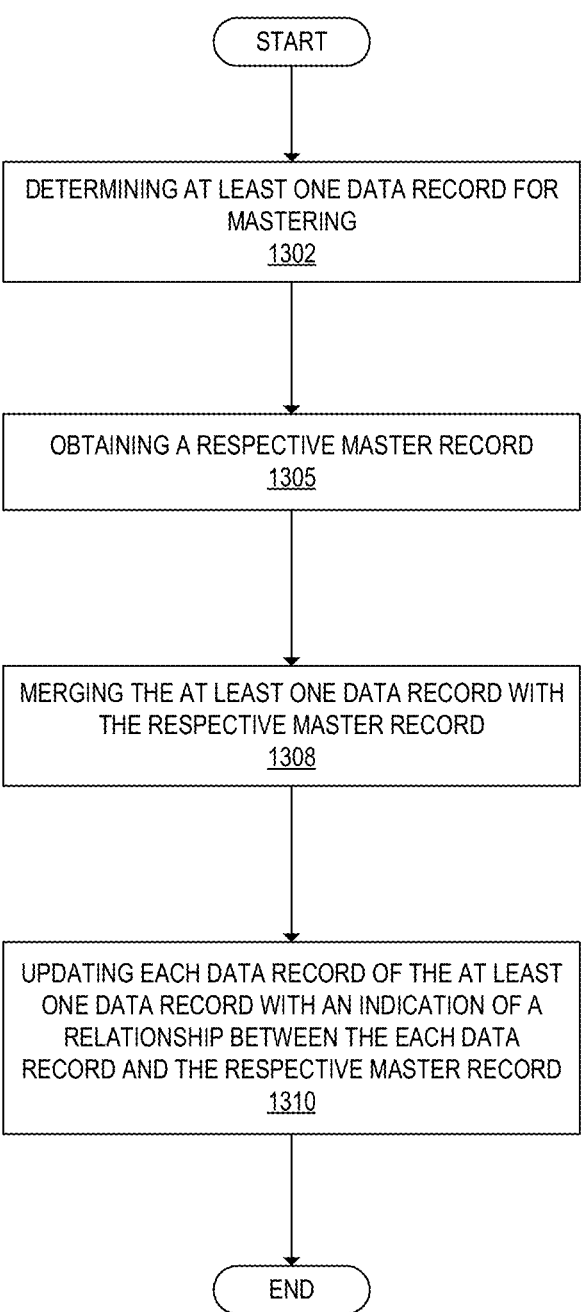
FIG. 13 shows a flowchart of a method for subsurface data record mastering, in accordance with one or more embodiments.

FIG. 13 shows a flowchart of a method for propagating record relationship information, in accordance with one or more embodiments. The method of FIG. 13 may be implemented using the system of FIG. 12 and one or more of the steps may be performed on or received at one or more computer processors.

Step 1302 includes determining at least one data record to be mastered. The data record to be mastered may be identified in an instruction. In some embodiments, the data records may be selected from one data source (for example, a database) which is being incorporated into another data source.

Step 1305 includes obtaining a respective master record. The respective master record may be created by copying at least a part of one of the data records to be mastered. Alternatively, the data record to be mastered may be created from scratch.

Step 1308 includes merging the at least one data record with the respective master record. The data from the at least one data record is copied into the respective master record.

If data from multiple sources overlap, the data may be combined using appropriate rules. The rules may include using the most recent data, averaging the data, giving priority to specific data source, etc.

Step 1310 includes updating each data record of the data records with a property value identifying a relationship between the data record and the respective master record. The source data records (the data records) are updated in order to provide relationship information. This may include storing a master record ID for the respective master record. Additional details may also be provided, such as a timestamp of the last update.

Figure 15:
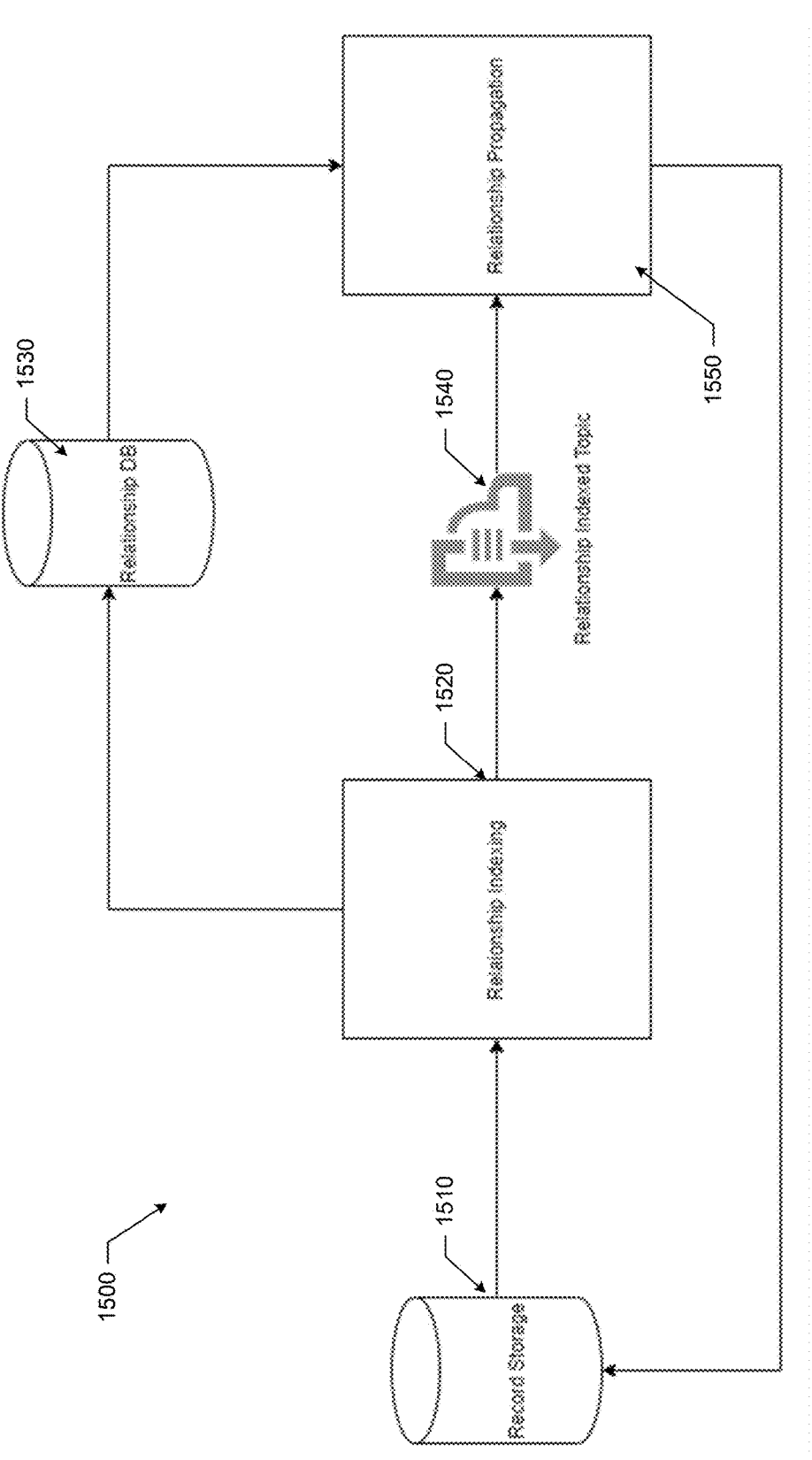

A relationship database, such as relationship database (1530) of FIG. 15, may be provided which indexes and stores relationship information of various records. The relationship database can be queried in order to locate the related master record for a source data record. The source data record may be updated to record the relationship identified from the relationship database.

While the various steps in the flowchart are presented and described sequentially, at least some of the steps may be executed in different orders, may be combined or omitted, and at least some of the steps may be executed in parallel. Furthermore, the steps may be performed actively or passively.

Figure 14:
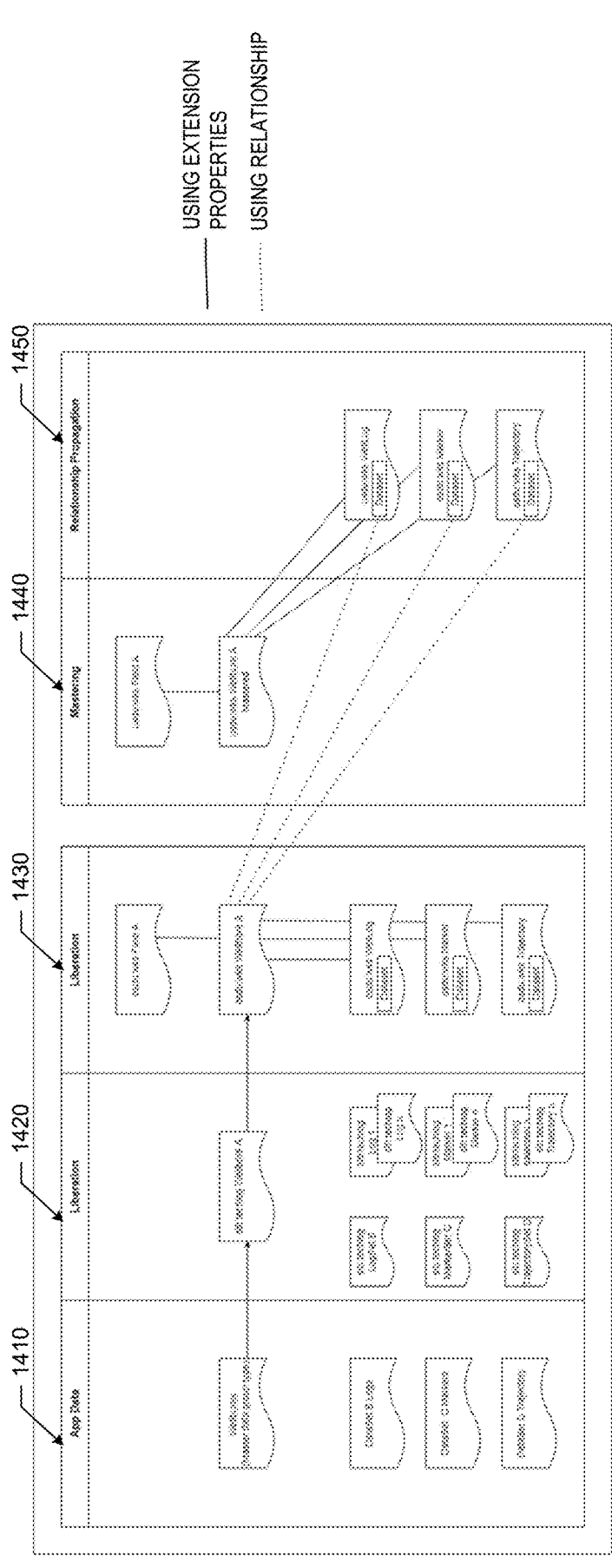

FIG. 14 shows a progression of data, in accordance with one or more embodiments. At the App Data stage (1410), data is stored in various records. For example, a wellbore master data file, Logs, Markers, and trajectory information may be stored. Source information from the data files may be liberated at the Liberation stage (1420). Liberation includes gathering data from the App Data. The gathered data may be stored in a suitable format.

At the Standardized stage (1430), data from various sources may be collected together. Data from different sources may be brought into conformity in order to ensure the data can be combined without creating errors. Once the data is standardized, the Mastering Stage (1440) merges the various records to create a master record.

The Relationship Propagation Stage (RPS) (1450) adds relationship information as a relationship property value to the source data records (for example, the standardized data). The relationship information provides details regarding the master record created from the source data. The relationship information may include details regarding the merged data, such as, how the data was merged (e.g., averaged with data from other sources), when the last merging of data was performed, etc.

FIG. 15 shows another computing architecture (1500), in accordance with one or more embodiments. Various data records may be stored in record storage (1510).

Relationship indexing (1520) tracks relationships between different data records, such as the sources of the master records. Relationship indexing (1520) may include graph representations where nodes and edges denote record and relationships. For example, the graph may include record as the nodes with the edges indicating relationships between the records. Alternatively, the relationship indexing may include storing record identifiers which indicate the related records, for example, master record relation details (1206) in the source data record (1202) of FIG. 12. The relationship indexing information may be stored in a relationship database (1530).

A relationship indexed topic (1540) may be a message indicating a target record which is to be updated (or was updated). The relationship propagation process (1550) can use the message to identify related records, for example, a master record generated from the target record. Once identified, the related record can be updated as well in order to ensure the related data is current.

FIG. 16 shows a flowchart of a method for propagating record updates using relationship information, in accordance with one or more embodiments. The method of FIG. 16 may be implemented using the system of FIG. 12 and one or more of the steps may be performed on or received at one or more computer processors.

Step 1602 includes receiving a relationship indexed topic. The relationship indexed topic may include a record update and an identified record ID. The record update provides details regarding a change to the data in the record associated with the identified record ID, for example, indicating the data has been recently revised.

Step 1604 includes extracting one or more record IDs from the relationship indexed topic message. Each record ID is read from the relationship indexed topic. Then, Step 1606 includes fetching records matching the record ID, for example, from a data storage device.

The records may include related schema. The schema includes relationship information, for example, identifying a master record created/updated from the record. Step 1608 includes finding associated record IDs using the schema of the record.

Step 1610 includes using the indexed relationship to find a related master record. Then, Step 1612 includes updating the fetched records to include a relationship between the record and the master record, for example, a record ID of the master record. Finally, Step 1614 includes storing the updated records.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 17A:
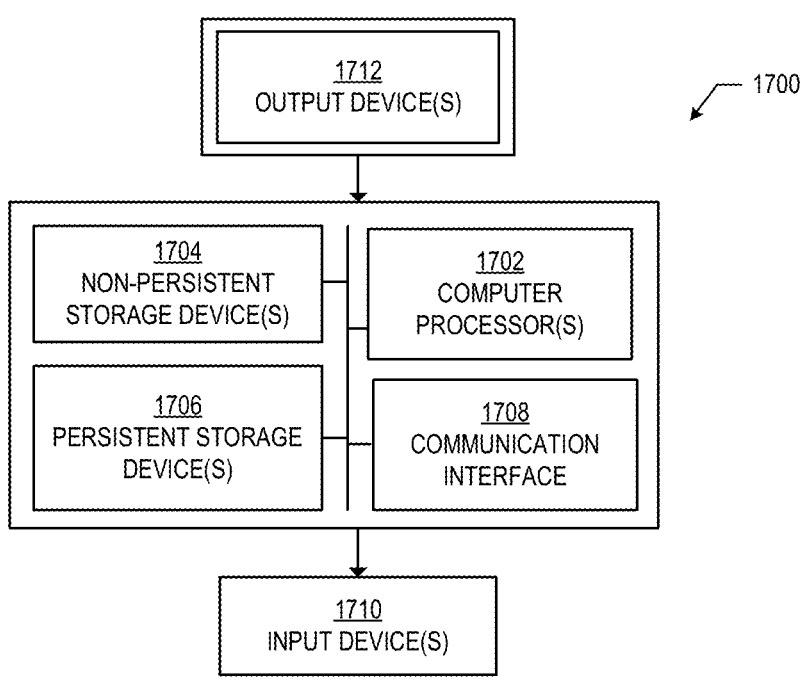
FIG. 17A and FIG. 17B show shows a computing system, in accordance with one or more embodiments.

For example, as shown in FIG. 17A, the computing system (1700) may include one or more computer processor (s) (1702), non-persistent storage device(s) (1704), persistent storage device(s) (1706), a communication interface (1708) (e.g., Bluetooth interface, infrared interface, network interface, optical interface, etc.), and numerous other elements and functionalities that implement the features and elements of the disclosure. The computer processor(s) (1702) may be an integrated circuit for processing instructions. The computer processor(s) (1702) may be one or more cores, or micro-cores, of a processor. The computer processor(s) (1702) includes one or more processors. The computer processor(s) (1702) may include a central processing unit (CPU), a graphics processing unit (GPU), a tensor processing unit (TPU), combinations thereof, etc.

The input device(s) (1710) may include a touchscreen, keyboard, mouse, microphone, touchpad, electronic pen, or any other type of input device. The input device(s) (1710) may receive inputs from a user that are responsive to data and messages presented by the output device(s) (1712). The inputs may include text input, audio input, video input, etc., which may be processed and transmitted by the computing system (1700) in accordance with one or more embodiments. The communication interface (1708) may include an integrated circuit for connecting the computing system (1700) to a network (not shown) (e.g., a local area network (LAN), a wide area network (WAN) such as the Internet, mobile network, or any other type of network) or to another device, such as another computing device, and combinations thereof.

Further, the output device(s) (1712) may include a display device, a printer, external storage, or any other output device. One or more of the output device(s) (1712) may be the same or different from the input device(s) (1710). The input device(s) (1710) and output device(s) (1712) may be locally or remotely connected to the computer processor(s) (1702). Many different types of computing systems exist, and the aforementioned input device(s) (1710) and output device(s) (1712) may take other forms. The output device(s) (1712) may display data and messages that are transmitted and received by the computing system (1700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (1702), is configured to perform one or more embodiments, which may include transmitting, receiving, presenting, and displaying data and messages described in the other figures of the disclosure.

Figure 17B:
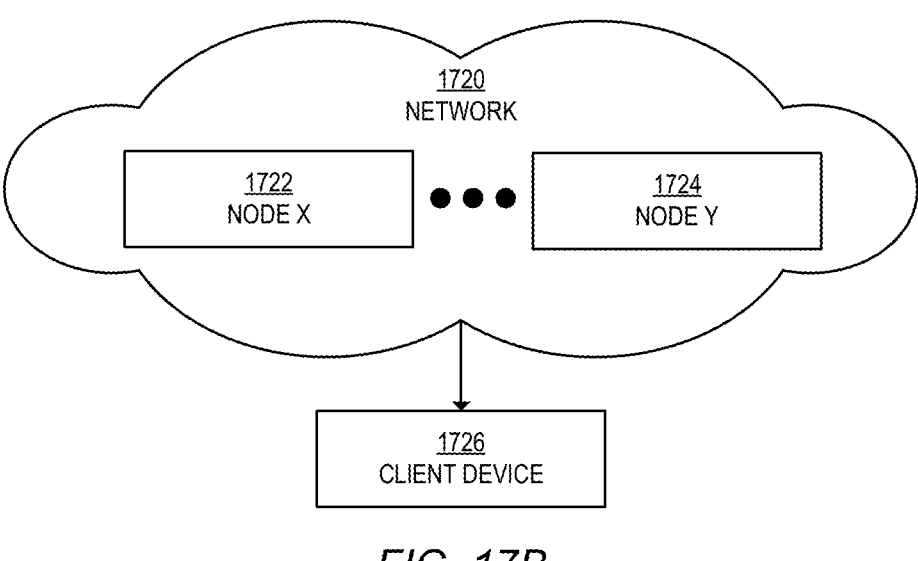

The computing system (1700) in FIG. 17A may be connected to, or be a part of, a network. For example, as shown in FIG. 17B, the network (1720) may include multiple nodes (e.g., node X (1722) and node Y (1724), as well as extant intervening nodes between node X (1722) and node Y (1724)). Each node may correspond to a computing system, such as the computing system shown in FIG. 17A, or a group of nodes combined may correspond to the computing system shown in FIG. 17A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1700) may be located at a remote location and connected to the other elements over a network.

The nodes (e.g., node X (1722) and node Y (1724)) in the network (1720) may be configured to provide services for a client device (1726). The services may include receiving requests and transmitting responses to the client device (1726). For example, the nodes may be part of a cloud computing system. The client device (1726) may be a computing system, such as the computing system shown in FIG. 17A. Further, the client device (1726) may include or perform all or a portion of one or more embodiments.

The computing system of FIG. 17A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of providing a subsurface master record for a subsurface data record, the method comprising:
   determining at least one subsurface data record for mastering;
   obtaining a respective subsurface master record that matches the at least one subsurface data record;
   merging the at least one subsurface data record with the respective subsurface master record to generate an updated subsurface master record inclusive of first data content from the respective subsurface master record and second data content from the at least one subsurface data record, wherein the first data content is generated from an original measurement in conjunction with an oil and gas operation, wherein the second data content is derived from an additional measurement that differs from the original measurement; and
   generating and transmitting a control signal causing performance of a physical action at a wellsite in conjunction with the oil and gas operation based on the updated subsurface master record, wherein the physical action comprises performance of one or more of varying a weight on a drill bit in a well at the wellsite, varying a torque on the drill bit in the well at the wellsite, varying a drilling trajectory of the well at the wellsite, varying a concentration of a fluid pumped into a wellbore of the well at the wellsite, or varying a flow rate of the fluid pumped into the wellbore of the well at the wellsite based on data in the updated subsurface master record.

2. The method of claim 1, comprising:
   converting the at least one subsurface data record into a standardized format to bring all subsurface data records into conformity with one another as having the standardized format;
   determining whether third data content in the at least one subsurface data record having the standardized format is duplicative of fourth data content in a second subsurface data record having the standardized format; and
   generating the updated subsurface master record using the at least one subsurface data record in place of the second subsurface data record based on determining that the third data content in the at least one subsurface data record having the standardized format is duplicative of the fourth data content in the second subsurface data record having the standardized format.

3. The method of claim 1, further comprising updating each subsurface data record of the at least one subsurface data record with an indication of a relationship between the each subsurface data record and the updated subsurface master record.

4. The method of claim 3, further comprising:
   receiving a relationship indexed topic message, the relationship indexed topic message comprising a record ID of an identified subsurface data record of the at least one subsurface data record and a record update to the identified subsurface data record;
   locating the updated subsurface master record using the indication of the relationship; and
   updating the updated subsurface master record with the record update.

5. The method of claim 3, wherein the relationship between the each subsurface data record and the updated subsurface master record indicates a link between the each subsurface data record and the updated subsurface master record.

6. The method of claim 5, wherein the relationship between the each subsurface data record and the updated subsurface master record defines a data type to be the link between the each subsurface data record and the updated subsurface master record.

7. The method of claim 1, wherein the updated subsurface master record includes, for each of the at least one subsurface data record merged with the updated subsurface master record, a relationship record of the each of the at least one subsurface data record.

8. The method of claim 1, wherein the determining the at least one subsurface data record for mastering comprises detecting that the at least one subsurface data record is new.

9. The method of claim 1, wherein the determining the at least one subsurface data record for mastering comprises detecting that the at least one subsurface data record has changed.

10. The method of claim 1, wherein the determining the at least one subsurface data record for mastering comprises:
  preparing a bulk endpoint; and
  providing, at the bulk endpoint, search results corresponding to at least one user provided search parameter.

11. The method of claim 10, wherein the preparing and the providing are preceded by a user driven change that implicates mastering.

12. The method of claim 1, wherein the obtaining comprises:
  executing match rules for the at least one subsurface data record;
  determining, based on the executing, that the respective subsurface master record does not exist; and
  generating the respective subsurface master record.

13. The method of claim 1, wherein the obtaining comprises:
  executing match rules for the at least one subsurface data record; and
  obtaining the respective subsurface master record in response to the executing.

14. The method of claim 1,
  wherein the determining at least one subsurface data record for mastering comprises determining a plurality of subsurface data records for mastering, and
  wherein the merging comprises applying, to the plurality of subsurface data records for mastering, a first priority rule of one or more sets of priority rules to the plurality of subsurface data records to select a first data source of a plurality of data sources to supply a first parameter to each respective subsurface data record of the plurality of subsurface data records, wherein the first priority rule for supplying of the first parameter includes a first ranking of the plurality of data sources based on trustworthiness of each data source of the plurality of data sources with respect to the first parameter and applying a second priority rule of the one or more sets of priority rules to the plurality of subsurface data records to select a second data source to supply a second parameter to each respective subsurface data record of the plurality of subsurface data records, wherein the second priority rule for supplying of the second parameter includes a second ranking of the plurality of data sources based on trustworthiness of each data source of the plurality of data sources with respect to the second parameter, wherein the plurality of data sources comprises a public data source, a government data source, a corporate data source, or any combination thereof.

15. The method of claim 1, further comprising:
  obtaining a liberated subsurface data record for mastering;
  obtaining a subsurface master data record that matches the liberated subsurface data record; and
  linking the liberated subsurface data record with the subsurface master data record.

16. The method of claim 1, further comprising:
  obtaining a liberated subsurface data record for mastering;
  determining that a subsurface master data record that matches the liberated subsurface data record does not exist;
  generating a subsurface master data record; and
  linking the liberated subsurface data record with the subsurface master data record.

17. A system for providing a subsurface master record for a subsurface data record, the system comprising:
  an electronic processor; and
  a non-transitory computer-readable medium comprising instructions, that, when executed by the electronic processor, configure the electronic processor to perform actions comprising:
  determining at least one subsurface data record for mastering;
  obtaining a respective subsurface master record that matches the at least one subsurface data record;
  merging the at least one subsurface data record with the respective subsurface master record to generate an updated subsurface master record inclusive of first data content from the respective subsurface master record and second data content from the at least one subsurface data record, wherein the first data content is generated from an original measurement in conjunction with an oil and gas operation, wherein the second data content is derived from an additional measurement that differs from the original measurement; and
  generating and transmitting a control signal causing performance of a physical action at a wellsite in conjunction with the oil and gas operation based on the updated subsurface master record, wherein the physical action comprises performance of one or more of varying a weight on a drill bit in a well at the wellsite, varying a torque on the drill bit in the well at the wellsite, varying a drilling trajectory of the well at the wellsite, varying a concentration of a fluid pumped into a wellbore of the well at the wellsite, varying a flow rate of the fluid pumped into the wellbore of the well at the wellsite, or any combination thereof based on data in the updated subsurface master record.

18. The system of claim 17, wherein the obtaining comprises:
  executing match rules for the at least one subsurface data record;
  determining, based on the executing, that the respective subsurface master record does not exist; and
  generating the respective subsurface master record.

19. The system of claim 17,
  wherein the determining at least one subsurface data record for mastering comprises determining a plurality of subsurface data records for mastering, and
  wherein the merging comprises applying, to the plurality of subsurface data records for mastering, priority rules that rank a plurality of data sources.

20. A non-transitory computer readable storage medium storing computer readable program code which, when executed by at least one processor, cause the at least one processor to perform operations comprising:

determining at least one subsurface data record to be mastered;

obtaining a respective subsurface master record that matches the at least one subsurface data record;

merging the at least one subsurface data record with the respective subsurface master record to generate an updated subsurface master record inclusive of first data content from the respective subsurface master record and second data content from the at least one subsurface data record, wherein the first data content is generated from an original measurement in conjunction with an oil and gas operation, wherein the second data content is derived from an additional measurement that differs from the original measurement;

updating each subsurface data record of the at least one subsurface data record with an indication of a relationship between the each subsurface data record and the updated subsurface master record; and generating and transmitting a control signal causing performance of a physical action at a wellsite in conjunction with the oil and gas operation based on the updated subsurface master record, wherein the physical action comprises performance of one or more of varying a weight on a drill bit in a well at the wellsite, varying a torque on the drill bit in the well at the wellsite, varying a drilling trajectory of the well at the wellsite, varying a concentration of a fluid pumped into a wellbore of the well at the wellsite, varying a flow rate of the fluid pumped into the wellbore of the well at the wellsite, or any combination thereof based on data in the updated subsurface master record.

*   *   *   *   *